United States Patent
Millman et al.

(10) Patent No.: US 9,392,415 B2
(45) Date of Patent: Jul. 12, 2016

(54) MODELING CONNECTIVITY OF TRANSIT SYSTEMS

(71) Applicant: Apple Inc., Cupertino, CA (US)

(72) Inventors: David Benjamin Millman, Mountain View, CA (US); Johan Olav Bergerengen, San Francisco, CA (US); Robert Mayor, Half Moon Bay, CA (US); Brian Stephen Smith, Campbell, CA (US)

(73) Assignee: Apple Inc., Cupertino, CA (US)

( * ) Notice: Subject to any disclaimer, the term of this patent is extended or adjusted under 35 U.S.C. 154(b) by 105 days.

(21) Appl. No.: 14/502,982

(22) Filed: Sep. 30, 2014

(65) Prior Publication Data

US 2016/0094950 A1    Mar. 31, 2016

(51) Int. Cl.
  *H04W 24/00*  (2009.01)
  *H04W 4/02*  (2009.01)
  *G06N 7/00*  (2006.01)

(52) U.S. Cl.
  CPC ............ *H04W 4/026* (2013.01); *G06N 7/005* (2013.01); *H04W 4/027* (2013.01); *H04W 4/028* (2013.01)

(58) Field of Classification Search
  CPC ..... H04W 4/028; H04W 4/008; H04W 4/023; H04L 67/18; H04L 67/22
  USPC ............................. 455/456.1–456.3; 370/338
  See application file for complete search history.

(56) References Cited

U.S. PATENT DOCUMENTS

| | | |
|---|---|---|
| 2002/0010531 A1 | 1/2002 | Hawthorne et al. |
| 2009/0105893 A1 | 4/2009 | Kernwein |
| 2013/0090801 A1 | 4/2013 | Backes et al. |
| 2014/0156180 A1 | 6/2014 | Marti et al. |
| 2014/0244156 A1* | 8/2014 | Magnusson ............ G01C 21/34 701/418 |

OTHER PUBLICATIONS

International Search Report and Written Opinion in International Application No. PCT/US2015/049710, mailed Dec. 7, 2015, 11 pages.

\* cited by examiner

*Primary Examiner* — Marcos Batista
(74) *Attorney, Agent, or Firm* — Fish & Richardson P.C.

(57) ABSTRACT

Methods, program products, and systems for using a location fingerprint database to determine a location of a mobile device are described. A mobile device can use location fingerprint data received from a server to determine a location of the mobile device at the venue. The mobile device can obtain, from a sensor of the mobile device, a vector of sensor readings, each sensor reading can measure an environment variable, e.g., a signal received by the sensor from a signal source. The mobile device can perform a statistical match between the vector and the location fingerprint data. The mobile device can then estimate a current location of the mobile device based on the statistical match.

30 Claims, 20 Drawing Sheets

MODELING CONNECTIVITY OF TRANSIT SYSTEMS

TECHNICAL FIELD

This disclosure relates generally to location determination.

BACKGROUND

Some mobile devices have features for determining a geographic location. For example, a mobile device can include a receiver for receiving signals from a global positioning satellite system (e.g., global positioning system or GPS). The mobile device can determine a geographic location, including latitude and longitude coordinates of the device, using the received GPS signals. In many places, GPS signals can be non-existent, weak, or subject to interference, such that it is not possible to determine a location accurately using the GPS functions of the mobile device alone. For example, a conventional mobile device often fails to determine a location based on GPS signals when the device is inside a train traveling underground in a subway system.

SUMMARY

Methods, program products, and systems for building a location fingerprint database for a transit system are described. The transit system can be a subway system including underground train stations and routes where location determination using GPS signals is difficult or impossible. A sampling device can measure signals, e.g., radio frequency (RF) signals detected at the stations or on the routes. A location server can construct a location fingerprint for each of the stations and the routes. Each location fingerprint can represent expected signal measurements by a user device if the user device is located at the respective station or route. The location server can provide the location fingerprint to a user device for the user device to determine a location of the user device within the station or on the route.

In some implementations, a sampling device can measure RF signals detected at a train station of a transit system or a route of the transit system. The sampling device, or a location server receiving the measurements, can filter RF signal measurements using one or more readings from sensors coupled to the sampling device and that are different from RF receivers. The readings can be taken concurrently with the RF signal measurements. These readings, designated as motion cues, can include motion sensor readings, barometer readings, or magnetometer readings. Using the motion cues, the sampling device or location server can distinguish different platforms of a station of the transit system and different levels of the station, or filter out RF signal measurements that may have been inaccurate, e.g., as caused by disturbances from a train entering or leaving a station. Measured sensor data can be used in location fingerprints. The location fingerprints, with or without motion data, can be used to distinguish between platforms.

In some implementations, a location server can determine connectivity of a transit system. The connectivity of a transit system can indicate a probability distribution of which station is reachable by a user carrying a user device and when the user will reach that station. The connectivity of a transit system can also indicate a probability distribution on a location of the user along a route of the transit system, given an initial location. The location server can provide data on the connectivity of the transit system to the user device. Using a location input determined using location fingerprint data, the user device can estimate a location of the user device within the transit system. The location input data can include, for example, on which platform of a station the user device is currently located, and whether the user device is on an express train that passed a station without stopping.

The techniques described in this specification can be implemented to achieve one or more advantages. For example, the location fingerprint data for a transit system can allow a user device to determine a location of the user device within a transit system even when GPS signals are unavailable or inaccurate, and when conventional location-determination functions fail. For example, the location fingerprint data can allow a mobile device to determine on which platform of an underground train station the mobile device is located, or a traveling direction and speed when the mobile device is in an underground tunnel.

The techniques described in this specification can supplement train schedules. For example, a train schedule specifying arrival and departure times at stations may not be always accurate due to unexpected and unscheduled delays. The techniques described can measure the time a user device arrives at a station and a speed the user device is travelling regardless of accuracy and applicability of a pre-defined train schedule, and provide a more realistic prediction of when the user may reach a destination. The user device can make the prediction when GPS signals are unavailable.

The mobile device can obtain location fingerprint data on an as-needed basis. For example, the mobile device can obtain location fingerprint data for a particular transit system, e.g., a subway system of a given city, or a particular transit line, e.g., one that the user rides to work every day. A location server need not provide location fingerprint data of additional transit systems or transit lines. Accordingly, the memory footprint, network bandwidth usage, and processor load for location determination can be minimized.

The details of one or more implementations of the subject matter are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Use Case

Figure 1:
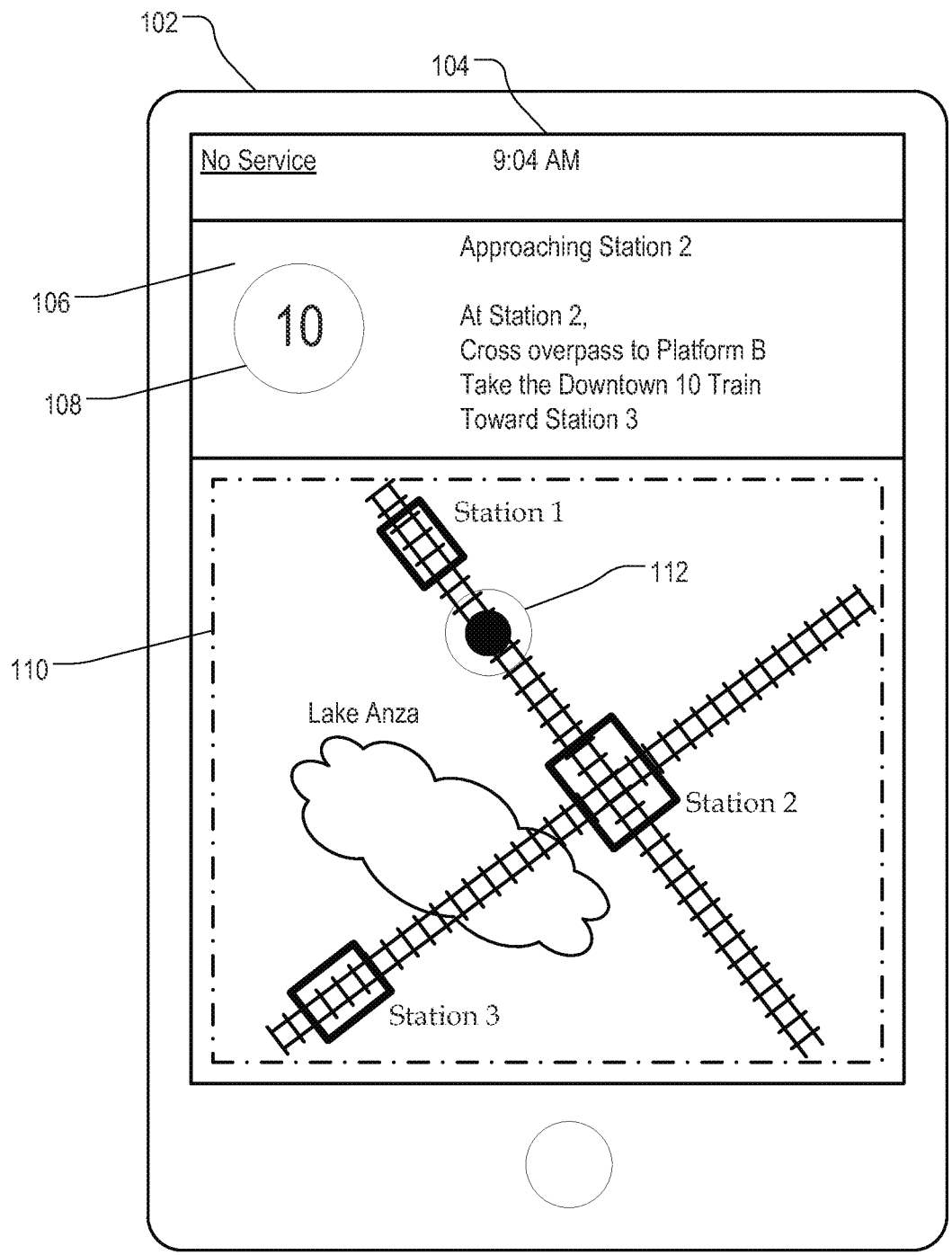
FIG. 1 illustrates an exemplary user interface in a use case in which a user device provides transit recommendations based on location fingerprint data.

FIG. 1 illustrates an exemplary user interface in a use case in which a user device provides transit recommendations based on location fingerprint data. Mobile device 102 is a user device programmed to receive location fingerprint data from a location server. The location fingerprint data can include a set of features associated with a transit system. Each feature can include multiple sets of expected readings of sensors of the mobile device 102, each feature corresponding to a portion of the transit system. The transit system can be a subway system having tracks and stations. The tracks and stations can be underground, where GPS signals are unavailable or inaccurate for location determination.

Mobile device 102 may already be programmed to provide route recommendations for reaching a destination from a starting location using public transit systems. A portion of the recommended route can be the subway system. At a given time, mobile device 102 can be on a train moving underground. Mobile device 102 can determine a location of the mobile device 102 within the transit system using location fingerprint data pre-loaded onto mobile device 102.

For example, mobile device 102 can pass station 1 at a given time. While passing station 1, a wireless receiver of mobile device 102 may detect RF signals of one or more wireless access points (APs). Mobile device 102 can determine a received signal strength indication (RSSI) for each detected signal and an identifier of each AP. Mobile device 102 can match the identifiers of the APs, the RSSIs, or both to the location fingerprint data and identify a station that has a location fingerprint data that matches the identifiers of APs or RSSIs. For example, the location fingerprint data can include a station "Station 1" associated with a media access control (MAC) address X identifying an AP that is detectable at "Station 1." Mobile device 102 can detect an RF signal including MAC address X. By matching the MAC address in the location fingerprint data and the detected RF signal, mobile device 102 can determine that mobile device 102 passed station "Station 1."

Then, after the train passes Station 1, mobile device 102 can determine an estimated location of mobile device 102 in the transit system. Based on transit connectivity data pre-stored on mobile device 102 that specifies which station is connected to which other station in the transit system, mobile device 102 can determine that mobile device 102 will reach Station 2 in Y minutes. In response, mobile device 102 can perform the following tasks.

Mobile device 102 can display user interface 104 to a user. User interface 104 can include prompt 106. Prompt 106 can include recommendation 108 indicating a next train for a user carrying mobile device 102 to take. Prompt 106 can include a text message indicating a recommended next action for the user to take. For example, the text message can include a suggestion for a user to go to a particular platform of the next station to take the next train.

User interface 104 can include transit map 110. Transit map 110 can include an overlay of a representation of the transit system on a geographic map. The representation can include, for example, stations of the transit system, names of the stations, and routes of the transit system. The geographic map can include, for example, streets, buildings, lakes, and rivers that are physically located above the transit system.

Mobile device 102 can display location marker 112 in the transit map 110. Location marker 112 can indicate an estimated location of mobile device 102 in the transit system. Location marker can include a point indicating the estimated location and an area surrounding the point indicating an error margin of the estimated location. Mobile device 102 can move location marker 112 along a route of the transit system, even when GPS signals are unavailable, upon determining that (1) mobile device 102 left Station 1, (2) a motion sensor indicates that mobile device 102 is moving, and (3) a barometer reading indicates that mobile device 102 is underground.

Various implementations on determining the location fingerprint data used by mobile device 102, refining the location fingerprint data, and determining connectivity of the transit system are described below.

Surveying a Transit System

Figure 2:
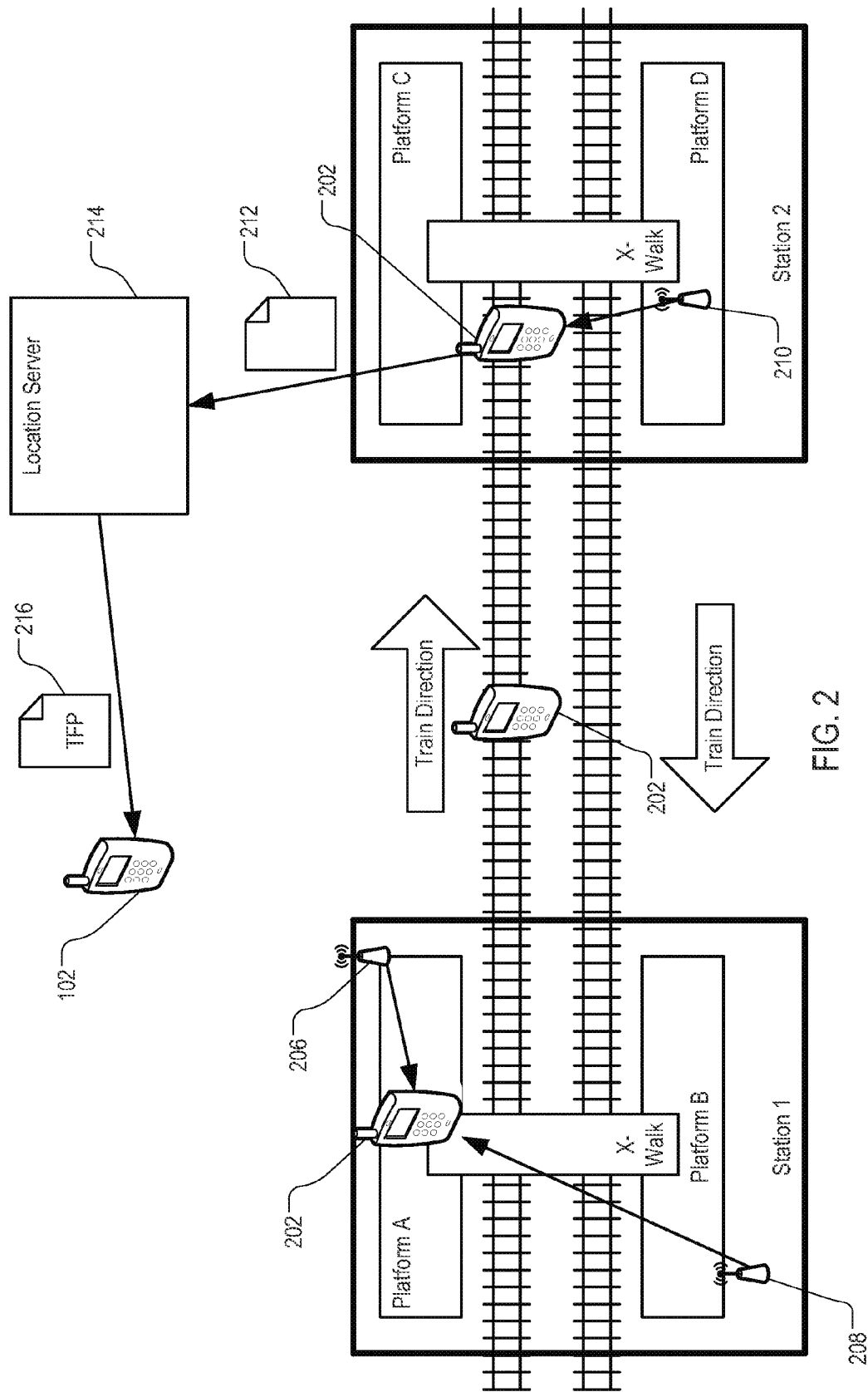
FIG. 2 illustrates exemplary survey techniques for generating location fingerprint data for a transit system.

FIG. 2 illustrates exemplary survey techniques for generating location fingerprint data for a transit system. Sampling device 202 can be a mobile device, e.g., a smart phone, programmed to record signal measurements in in-station surveys and ride-the-line surveys. In-station surveys can include surveys performed at a station of the transit system. Ride-the-line surveys can include surveys performed in a train traveling between stations.

Sampling device 202 can store a list of transit systems to survey, a list of stations in each transit system to survey, and a list of between-station routes of each system to survey. Sampling device 202 can be carried by a surveyor. When the surveyor reaches a station of a transit system that is on a route of the transit system, the surveyor can select, from the lists, an identifier of the transit system and an identifier of the route to start the survey.

In a first in-station survey, sampling device 202 can detect signals in Station 1 of a transit system. The signals can be RF signals from signal sources 206 and 208. Signal sources 206 and 208 may or may not be located inside of Station 1. Sampling device 202 can be carried to different sections of Station 1, e.g., Platform A, which is a platform for northbound trains, Platform B, which is a platform for south-bound trains, and a crosswalk, which is an overpass or underpass connecting Platform A and Platform B. Sampling device 202 can record measurements of the RF signals, e.g., RSSIs, and respective identifiers, e.g., MAC addresses, of the signal sources 206 and 208. Sampling device 202 can associate the measurements with an identifier of the place the measurements are taken. The identifier can include a surveyor-provided identifier of the platform or crosswalk, an identifier of the station, and an identifier of the transit system.

Sampling device 202 can be carried by the surveyor to a train that leaves Station 1. Sampling device 202 can perform a ride-the-line survey while traveling on the train to Station 2. In a ride-the-line survey, sampling device 202 measures signals detected while sampling device 202 travels along a route of the transit system, or lack of signals along the route. Additional details of the ride-the-line survey are described below in reference to FIG. 6.

Upon reaching Station 2, sampling device 202 can perform a second in-station survey by measuring RF signals from signal source 210, which can be located inside or outside of Station 2. Sampling device 202 can submit measurement data 212 to location server 214 through a wired or wireless communication network. Measurement data 212 can include identifiers of the transit system, the stations, and the platforms associated with the measurements. In some implementations, location server 214 and sampling device 202 can be a same device. In some implementations, sampling device 202 can perform at least a portion of operations of location server 214.

Location server 214 can include one or more computer processors programmed to generate location fingerprint data 216 from the measurement data 212 by performing statistical analysis on the measurement data 212. Location server 214 can provide the location fingerprint data 216 to mobile devices, e.g., for download. A user device, e.g., mobile device 102, can determine a location of the user device inside the transit system, e.g., on which of platforms A, B, C, or D the user device is located, on which track the user device is traveling, and to which of Station 1 or Station 2 the user device is heading.

Figure 3A:
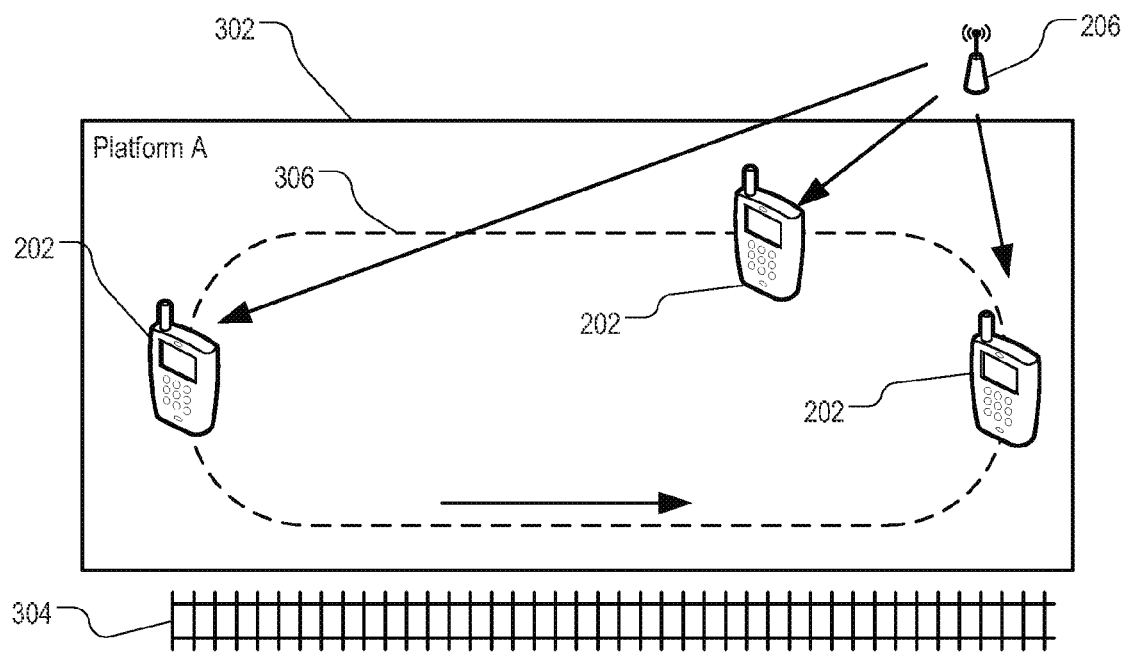
FIG. 3A illustrates exemplary survey techniques for generating location fingerprint data for a platform in a station of a transit system.

FIG. 3A illustrates exemplary survey techniques for generating location fingerprint data for a platform in a station of a transit system. The techniques can be used in in-station surveys.

Sampling device 202 can be carried by a surveyor to platform 302. Sampling device 202 can receive an input from the surveyor. The input can include an identifier of platform 302, e.g., "Platform A." Platform 302 can be a part of a station of a transit system that includes multiple stations and multiple tracks, e.g., track 304. Platform 302 and track 304 may be underground.

Being carried by the surveyor, sampling device 202 can move on platform 302 in a random pattern or following a pre-specified pattern, e.g., following path 306. While moving, sampling device 202 can record measurements of signals detected by sampling device 202, e.g., RF signals from signal source 206. In addition, in some implementations, sampling device 202 can record readings from sensors other than RF receivers. For example, sampling device 202 can record sound level, air pressure level, or magnetic field. Sampling device 202 can associate the measurements with an identifier. A gradual increase in sound level, air pressure level, and magnetic field disturbance may indicate that a train is approaching the station where platform 302 is located. Likewise, a gradual decrease in those readings may indicate that a train is departing the station. Sampling device 202 can associate the readings with the signal measurements. Sampling device 202 can submit the measurements and associated readings to a location server.

Figure 3B:
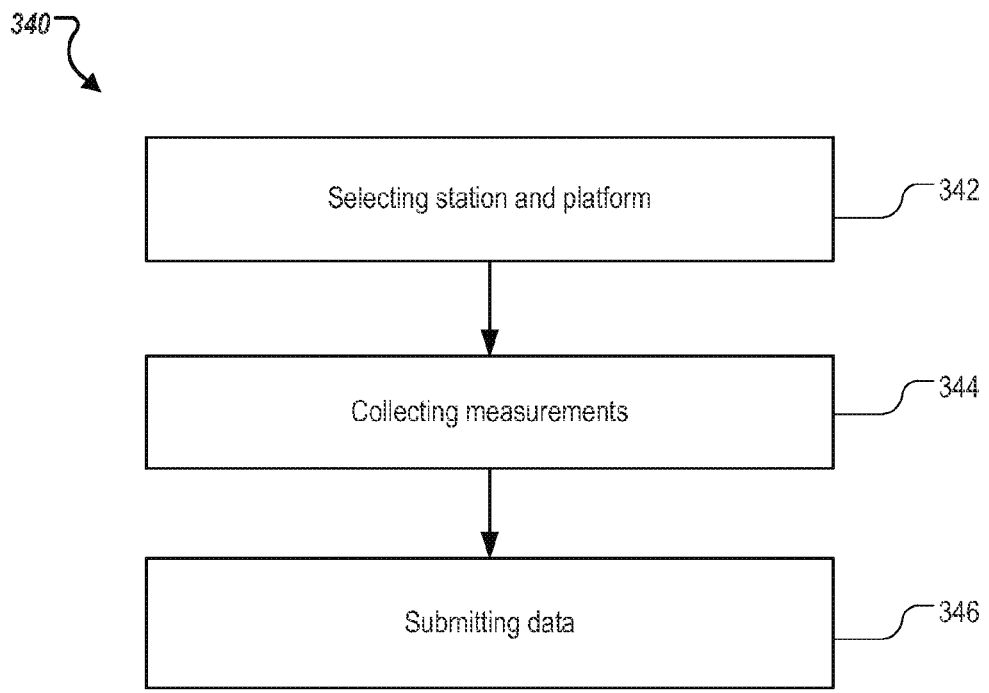
FIG. 3B is a flowchart illustrating an exemplary process of surveying a platform of a station.

FIG. 3B is a flowchart illustrating an exemplary process 340 of surveying a platform of a station. Process 340 can be performed by a sampling device, e.g., sampling device 202 of FIG. 2.

The sampling device can select (342), in response to a surveyor input and from a list of pre-specified list of transit systems and stations, a transit system and a station to survey. In some implementations, the sampling device can select a pre-specified platform. In some implementations, the sampling device can receive a surveyor input identifying a platform.

Upon receiving an input to start surveying, the sampling device can collect (344) signal measurements and sensor readings. The signal measurements can include RF signal strength readings, e.g., RSSIs. The signal measurements can be associated with one or more identifiers of one or more signal sources. An identifier of a signal source can be a MAC address of the signal source, or any other identifier that can uniquely identify the signal source. In some implementations, the sampling device can associate other sensor readings with the signal measurements. The sampling device can collect the signal measurements repeatedly for a pre-specified period of time, e.g., five minutes. The sampling device may be moving, so each time the sampling device takes measurements from multiple signal sources that are in fixed locations, the values of the measurements may be different from measurements of an earlier time.

The sampling device can submit (346) the collected signal measurements, the associated signal source identifiers, and optionally, the associated other sensor readings to a location server for determining a location fingerprint of the station and platform. The location server can then provide the location fingerprint to a user device for determining a location of the user device.

Figure 4:
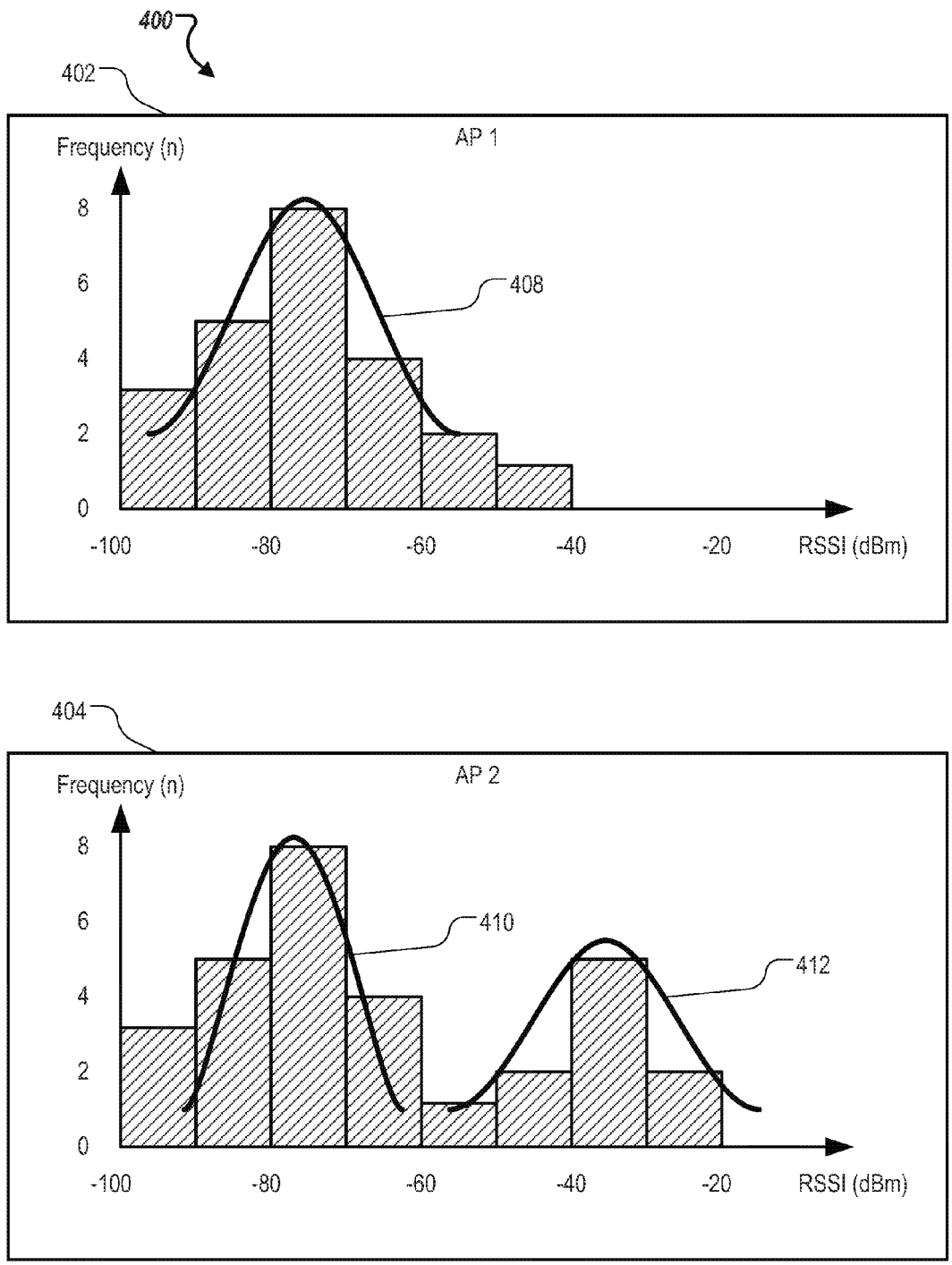
FIG. 4 illustrates an exemplary signal profile of a station of a transit system.

FIG. 4 illustrates an exemplary signal profile 400 of a station. Signal profile 400 can be associated with a station of a transit system or a platform of a station of the transit system. Signal profile 400 can include one or more discrete or continuous probability distributions of number of measurements associated with the station or platform. For example, signal profile 400 can include histograms of signal measurements associated with the station or platform. In the example shown, the signal profile includes histogram 402 associated with a first signal source, AP 1, and histogram 404 associated with a second signal source, AP 2.

Each of histogram 402 and histogram 404 can be generated based on signal measurements taken by a sampling device, e.g., sampling device 202 of FIG. 2, at the associated station or platform. Each of histogram 402 and histogram 404 can represent a distribution of number of measurement over RSSI of the corresponding signal source. Each histogram can include discrete intervals, referred to as bins, that are defined by signal strength. For example, a first bin can include measurements of the RSSIs between −100 decibel-milliwatts (dBm) and −90 dBm, a second bin can include measurements of the RSSIs between −90 dBm and −80 dBm, and so on. The frequency in each bin can be a number of measurements of RSSI values that fall into the bin.

A location server, e.g., location server 214, can determine a location fingerprint for a corresponding station or platform from signal profile 400. The location fingerprint can include a set of expected measurements a user device is predicted to observe at the station or platform. The expected measurements can correspond to identifiers of signal sources. The location server can determine the expected measurements from the histograms 402 and 404 by extrapolation or interpolation using various statistical analyses. In some implementations, the location server can select statistical tools to perform the extrapolation or interpolation based on patterns in the histograms 402 and 404. For example, the location server can determine that histogram 402 represents a unimodal distribution, having a single peak 408 among frequencies. The location server can then choose an algorithm that is suitable for extrapolating an expected measurement from unimodal data. The location server can determine that histogram 404 represents a multimodal distribution, having a first peak 410 and a second peak 412 among frequencies. The location server can then choose an algorithm that is suitable for extrapolating an expected measurement from multimodal data.

Figure 5A:
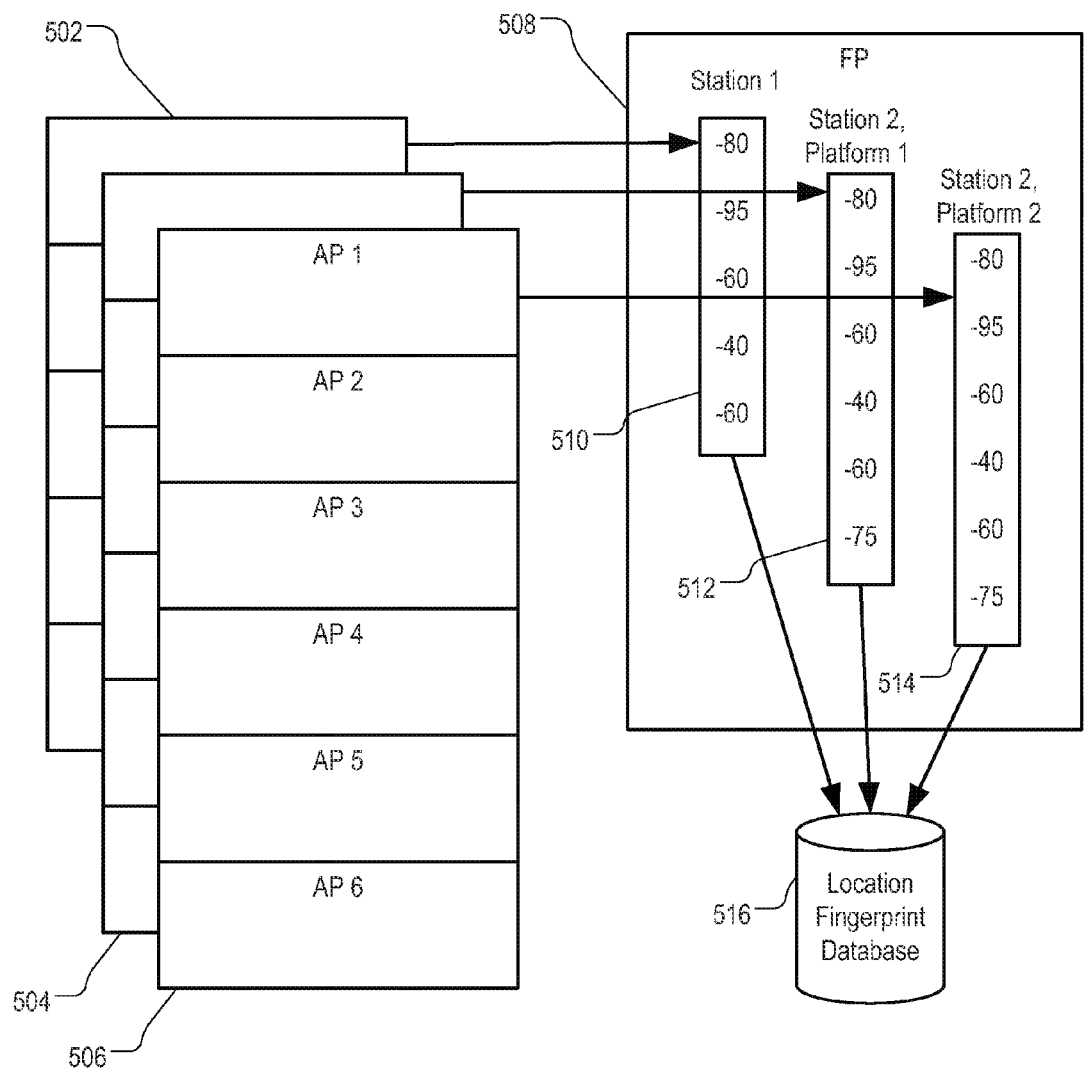
FIG. 5A illustrates exemplary techniques of determining location fingerprint data from signal profiles.

FIG. 5A illustrates exemplary techniques of determining location fingerprint data from signal profiles. A location server, e.g., location server 214, can receive measurements from one or more sampling devices, e.g., sampling device 202. The location server can determine signal profiles 502, 504, and 506 from the received measurements. Signal profile 502 can be associated with a first station, Station 1. Signal profiles 504 and 506 can be associated with a first platform and a second platform of a second station, Station 2, respectively. Signal profiles 504 and 506 can correspond to a same set of signal sources. Signal profile 502 can correspond to a different set of signal sources.

The location server can determine location fingerprint data 508 from signal profiles 502, 504, and 506. Location fingerprint data 508 can include location fingerprints 510, 512, and 514, corresponding to signal profiles 502, 504, and 506, respectively. The location server can designate location fingerprints 510, 512, and 514 as location fingerprints of the first station, the first platform of the second station, and the second platform of the second station, respectively. The location server can store the location fingerprints 510, 512, and 514, in association with their respective transit system identifiers, station identifiers, platform identifiers, and signal source identifiers in location fingerprint database 516.

Figure 5B:
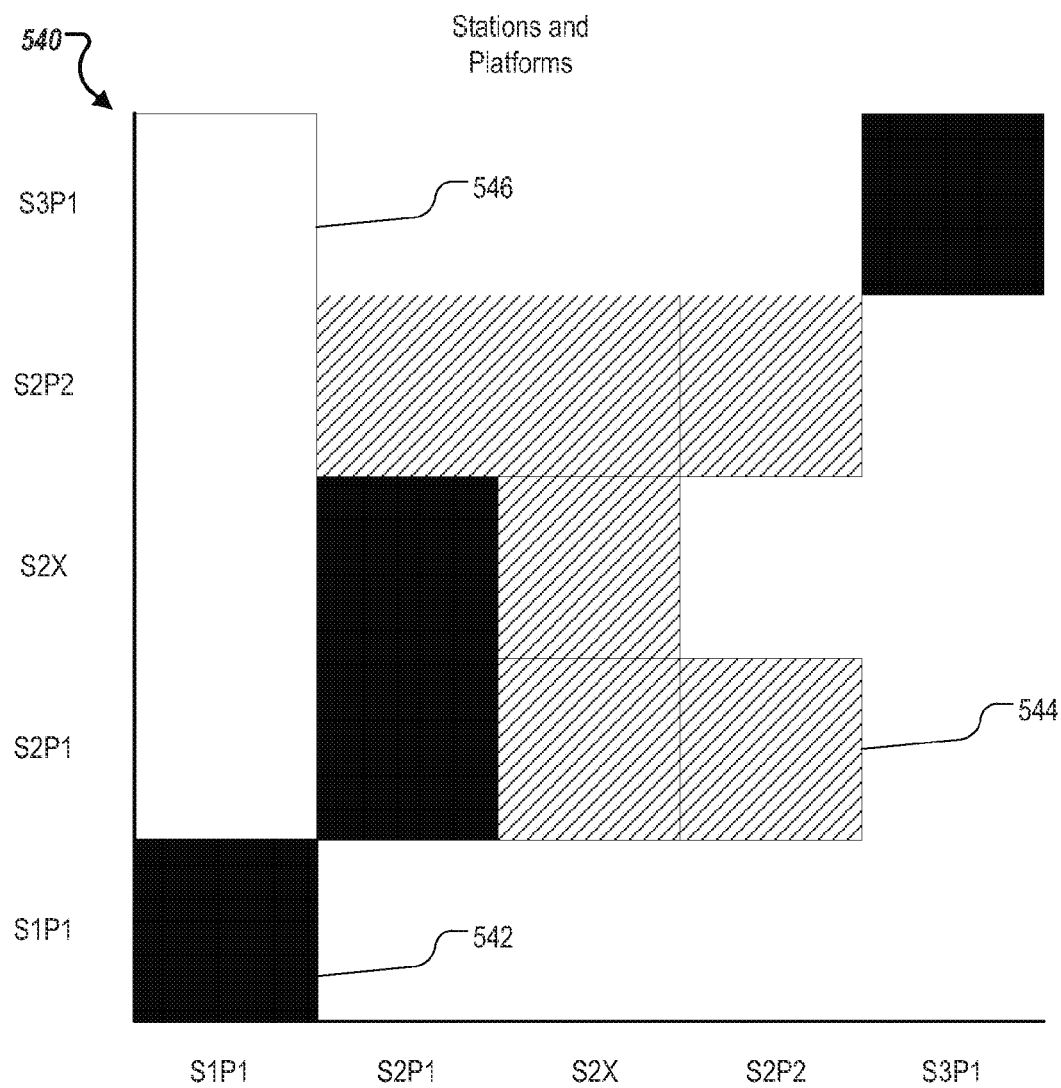
FIG. 5B is an exemplary affinity likelihood map for determining if a user device entered a particular station or platform.

FIG. 5B is an exemplary affinity likelihood map 540 for determining if a user device entered a particular station or platform. A location server, e.g., location server 214 of FIG. 2, can use affinity likelihood map 540 to verify data received from sampling devices.

The location server can represent mapping between signal measurements from different surveys of a same transit system on multiple dimensions, each dimension representing a survey and including various stations and platforms surveyed. In exemplary affinity likelihood map 540, two dimensions are shown. Each of a horizontal and a vertical dimension can represent a first survey and second survey, respectively. Each of the first survey and second survey can be performed at a first station having one platform (S1P1), a second station having two platforms (S2P1, S2P2) and a crosswalk (S2X), and a third station having one platform (S3P1).

A black square, e.g., square 542, represents a strong affinity where a degree of match between the first survey and the second survey satisfies a threshold having a high threshold value. A shadowed square, e.g., square 544, represents a weak affinity where a degree of match between the first survey and the second survey satisfies a threshold having a low threshold value. A blank space, e.g., square 546, represents non-match. For convenience, only matches that satisfy a high threshold value or a low threshold value are illustrated. Squares of non-matches, except square 546, are not shown. In various implementations, various threshold values can be represented by a spectrum of various colors or various shades of grey in an affinity likelihood map.

The location server can provide affinity likelihood map 540 for display on a display device. The location server can use affinity likelihood map 540 as a reference for transition between inside of station areas and outside of station areas. The location server can use affinity likelihood map 540 to predict which station or platform may have strong or weak signal measurements.

For example, the location server may determine that a user device, if located on platform S2P1 or crosswalk S2X, may have strong signal measurements that match those of platform S2P1. Accordingly, the location server can set a high threshold value for matching to determine that a mobile device is on platform S2P1, to avoid a false positive of determining that the user device is on platform S2P1 whereas the mobile device is on crosswalk S2X. Likewise, the location server may determine that a user device, if located on platform S2P2 or crosswalk S2X may have weak signal measurements that match those of platform S2P2. Accordingly, the location server can set a low threshold value for matching to determine that a user device is on platform S2P2, but assign higher uncertainty to the match. A user device, when using measurement fingerprints to determine a location, may display a location marker having a smaller uncertainty area if the determined location is on platform S2P1, and a larger uncertainty area if the determined location is on platform S2P2.

Figure 6:
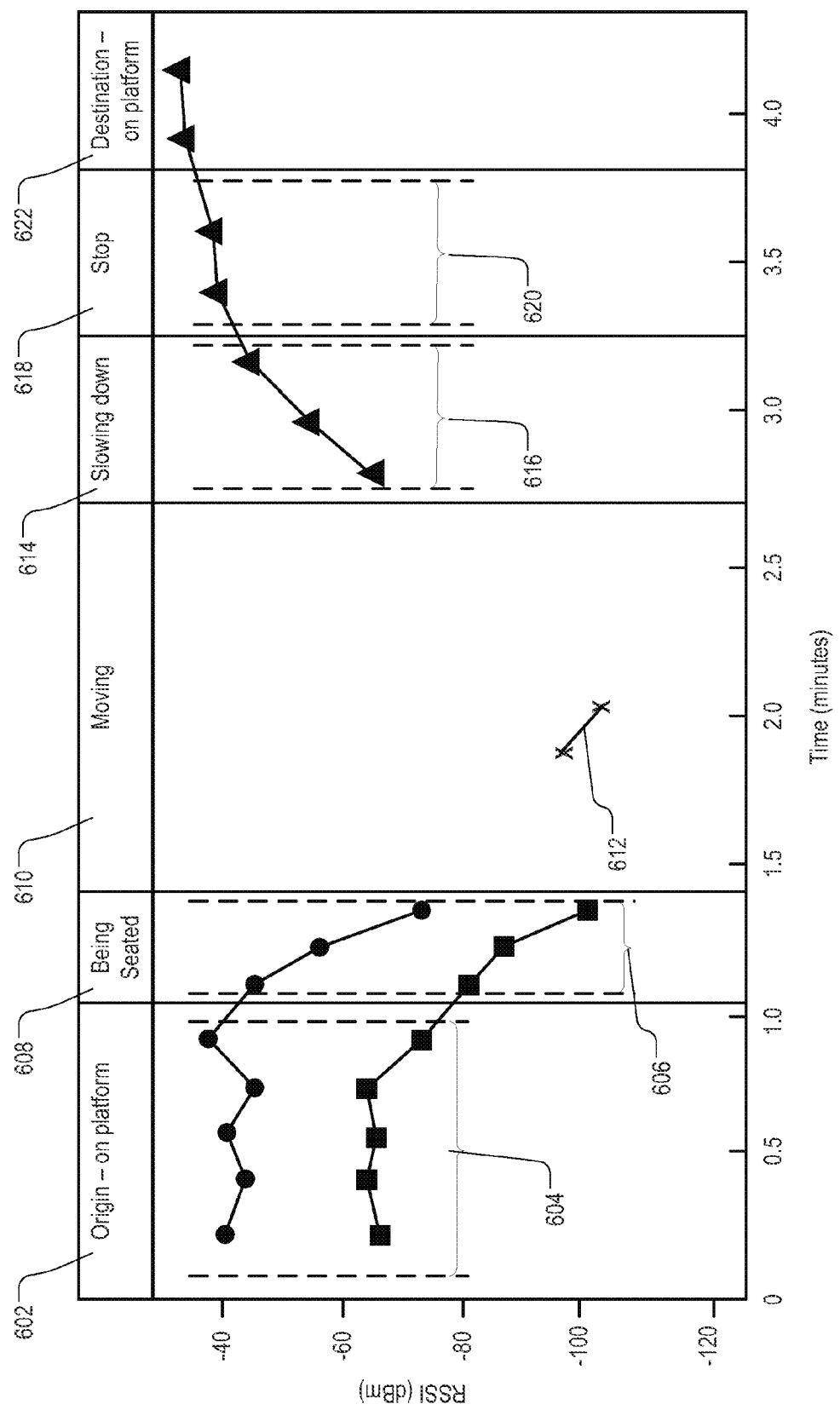
FIG. 6 illustrates signal measurement data from an exemplary ride-the-line survey.

FIG. 6 illustrates signal measurement data from an exemplary ride-the-line survey. A sampling device, e.g., sampling device 202 of FIG. 2, can be programmed to record signal measurements of a portion of a transit system between two stations while the sampling device travels on a train that runs from a first station to a second station. A location server, e.g., location server 214, can determine a time-based location fingerprint for the portion of the transit system.

The sampling device programmed to conduct a ride-the-line survey can provide a user interface displaying options for selecting a transit system and a section of a route of the transit system. The options for selecting the transit system can include a list of transit identifiers. Upon receiving a surveyor input selecting a transit identifier, e.g., a transit operator name "Acme Rapid Transit," the sampling device can provide for display a list of route identifiers in that transit system. Upon receiving a surveyor input selecting a route identifier, e.g., "Civic Center to Embarcadero line," the sampling device can provide for display a list of stations along that route, and options for selecting a station for an in-station survey or a ride-the-line survey. Upon receiving an input selecting a ride-the-line survey, the sampling device can provide display options for selecting various stages of the ride-the-line survey.

Upon receiving a selection first stage 602, surveying on originating platform, the sampling device can take signal measurements on a platform of the station where the ride begins. The measurements can include signal measurements 604 of RSSIs of signals from a first signal source and a second signal source detectable on the platform. The measurements can be associated with a tag specifying that the measurements are taken for the first stage of a ride-the-line survey. The sampling device, or a location server receiving the measurements, can designate signal measurements 604 taken at first stage 602 as measurements of an in-station survey as well as a portion of a ride-the-line survey, if the measurements are taken in sufficient amount of time that satisfies an in-station survey time threshold and include sufficient number of samples.

After the surveyor carrying the sampling device boards the train, the sampling device can receive an input from the surveyor selecting a second stage 608, being seated. The second stage 608 can be a stage of a ride-the-line survey when the surveyor entered a train, walks through an aisle, locate a place on the train, e.g., an empty seat, and remains stationary at the place, e.g., by sitting down at the seat. In response to this input, the sampling device can take signal measurements 606 from inside of the train. In this stage, metal panels of the train may block or weaken some signals from signal sources located in the station. The train may start moving away from the station, causing RSSIs of signals from the first signal source and the second signal source to drop. The measurements taken after receiving the input selecting the second stage 608 can be associated with a tag specifying that the signal measurements 606 are taken for the second stage 608 of a ride-the-line survey.

Upon being seated, the sampling device can receive an input specifying that the ride-the-line survey entered a third stage 610. The third stage 610 can be a stage of a ride-the-line survey when the train moves along a track to a destination station at constant or various. In third stage 610, the sampling device may or may not receive any signals from signal sources, when the train carrying the sampling device travels in underground tunnels. In some transit systems, a portion of the track may go above ground. When the sampling device reaches this portion, the sampling device may detect signals from various signal sources, e.g., from wireless access points of businesses located along a route of the transit system. The sampling device can take measurements 612 of these signals and associate the measurements with a tag indicating that measurements 612 are taken in third stage 610 of a ride-the-line survey. In other portions of the track, the sampling device may detect no signals. The sampling device can record the information that no signals are detected as negative information, which may be part of the location fingerprint of the route.

The sampling device can receive an input specifying that the ride-the-line survey entered a fourth stage 614. The fourth stage 614 of the survey can be a stage that a train carrying the sampling device slows down to prepare to enter a destination station. In fourth stage 614, the sampling device may detect signals from signal sources located at or near the destination station. The sampling device can associate signal measurements 616 of the detected signals with a tag specifying that measurements 616 are taken in fourth stage 614 of the ride-the-line survey.

The sampling device can receive an input specifying that the ride-the-line survey entered a fifth stage 618. The fifth stage 618 of the survey can be a stage that a train carrying the sampling device stops at a destination station. Doors on the train may open. The surveyor may walk to the door from the seat of the train, and exit. In fifth stage 618, the sampling device may detect signals from signal sources located at or near the destination station. The signals may be partially blocked or weakened by metal panels of the train. The sampling device can associate signal measurements 620 of the detected signals with a tag specifying that measurements 620 are taken in fifth stage 618 of the ride-the-line survey.

After exiting the train, the sampling device can receive an input specifying that the ride-the-line survey entered a sixth stage 622. The sixth stage 622 of the survey can be a stage where the sampling device takes measurements at a destination station. The sampling device can then designate the destination station as an originating station for a next ride-the-line survey.

In the example described, each stage of the ride-the-line survey is triggered by a surveyor input. In various implementations, each stage can be triggered automatically by one or more sensors of the mobile device. For example, the sampling device can receive, at the originating station, an input initiating the ride-the-line survey. The sampling device can start the first stage 602 of the survey. The sampling device can detect an air pressure change that coincides with a magnetic field change and a sound pressure level change. In response, the sampling device can determine that the sampling device entered a train and start the second stage 608 of the survey.

The sampling device can then detect an acceleration that propels the sampling device to a speed that is faster than a human walking speed. Upon determining that the acceleration stops, the sampling device can determine that the train is moving at a constant speed. In response, the sampling device can start the third stage 610 of the survey. The sampling device can detect a deceleration that slows down the train. In addition, the sampling device can determine that a difference between time that passed between the acceleration and the deceleration and a travel time between the originating station and the destination station as specified in a pre-stored train schedule is less than a threshold difference level. In response, the sampling device can start the fourth stage 614 of the survey. Upon determining from an accelerometer that a complete stop has been achieved, the sampling device can start the fifth stage 618 of the survey. Then, upon determining a decrease in sound pressure level, air pressure, disturbance in magnetic field, the sampling device can determine the train that carried the sampling device to a station has departed separately. In response, the sampling device can start the sixth stage of the survey.

The sampling device can submit signal measurements taken at each stage of the survey to a location server. The location server can determine a time-based location fingerprint of a section of the transit system surveyed from the signal measurements.

Modeling Connectivity of a Transit System

Figure 7A:
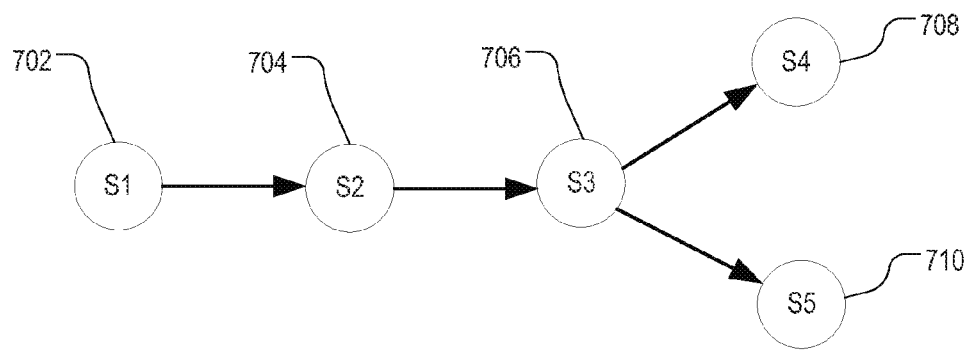
FIGS. 7A, 7B, and 7C illustrate exemplary techniques of determining connectivity between stations of a transit system.
Figure 7B:
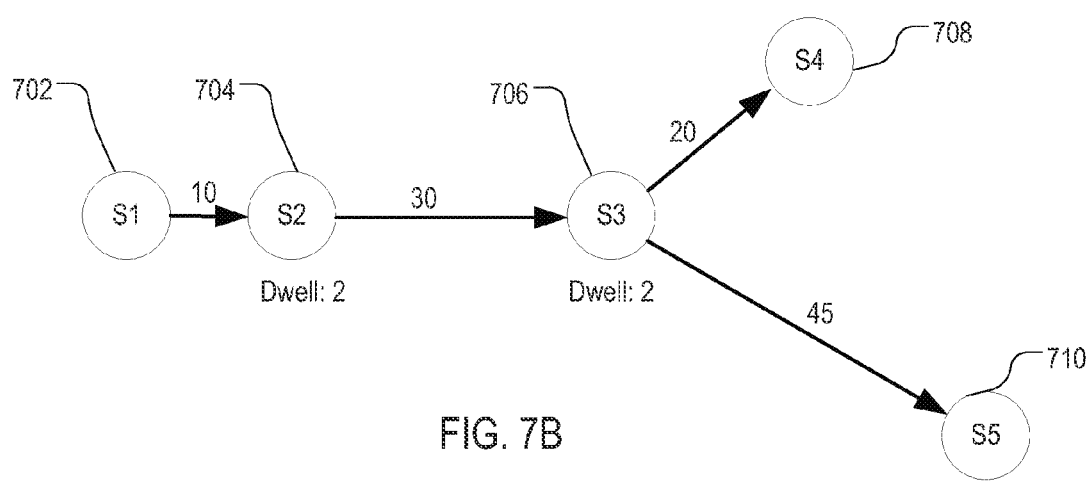
Figure 7C:
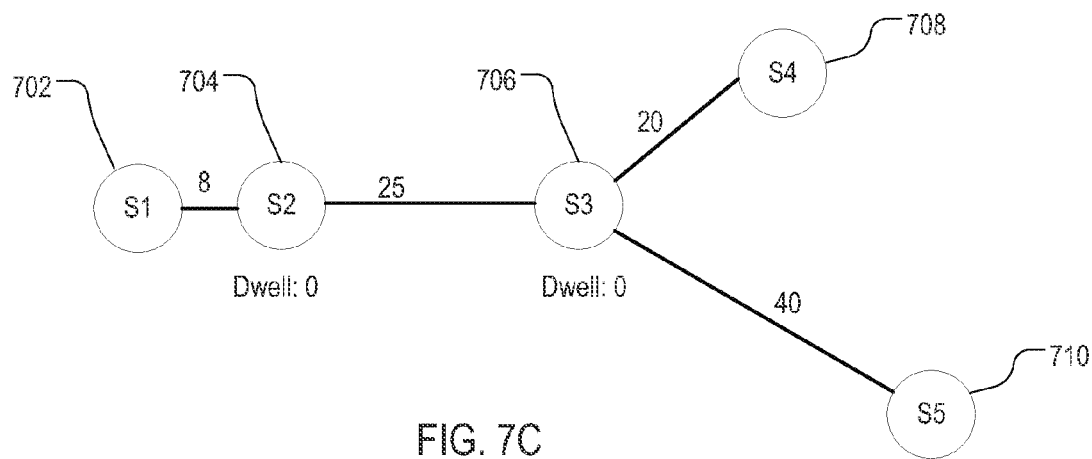

FIGS. 7A, 7B, and 7C illustrate exemplary techniques of determining connectivity between stations of a transit system. Connectivity between stations can indicate, from a given platform or floor of a station, how much time a mobile device takes to travel to another station. The connectivity can be based on geometry as well as time. Accordingly, given connectivity information, a user device can estimate a geographic location of the user device in the transit system, even when the user device is traveling underground in a subway train. A location server, e.g., location server 214 of FIG. 2, can determine connectivity of a transit system from survey data received from a sampling device, e.g., sampling device 202 of FIG. 2. In some implementations, the sampling device can determine connectivity of a transit system upon completing in-station surveys and ride-the-line surveys of the transit system.

FIG. 7A illustrates exemplary inputs to a location server for determining connectivity of a transit system. The input can include a list of identifiers of stations 702, 704, 706, 708, and 710. The input can include information on which station is directly connected to which other station or stations. The stations can be represented as nodes in a directed graph. The connections between stations can be represented as unidirectional or bidirectional edges between nodes.

FIG. 7B is an exemplary graph representation of connectivity of a transit system as determined by a location server. The location server can determine, from a set of in-station surveys and ride-the-line surveys, temporal distances between stations. A sampling device, when taking measurements in a station in a transit system, e.g., station 702, can record identifiers of signal sources detectable in the station. The sampling device can associate the identifiers with their respective stations. The location server can designate the identifiers designated as a signal signature of a corresponding station. A user device, upon detecting signals from identified signal sources, can determine which station the user device is located by matching identifiers of signal sources in the detected signals with signal signatures provided by the location server.

In addition, the location server can associate a temporal distance from a first station to a second station to a section of the transit system from the first station to the second station. For example, the location server can determine that a temporal distance from station 702 to station 704 is ten minutes. The location server can associate the value of 10 minutes to an edge linking a first node representing the station 702 and a second node representing station 704 and pointing from the first node to the second node. The location server can determine a dwell time of each station and associate the dwell time with the corresponding station. For example, the location server can determine that the sampling device stayed at each of station 704 and station 706 for two minutes. The location server can then associate dwell time of 2 minutes to each of station 704 and station 706.

FIG. 7C is a second exemplary graph representation of connectivity of the transit system of FIG. 7B. The location server can determine, from a second set of in-station surveys and ride-the-line surveys, temporal distances between stations that are different from those described in reference to FIG. 7B. For example, the location server can determine that a temporal distance from station 702 to station 704 is eight minutes. The location server can associate the value of 8 minutes to an edge linking a first node representing the station 702 and a second node representing station 704 and pointing from the first node to the second node. In addition, the location server can determine that the sampling device did not stay at stations 704 and 706 before reaching station 710. In response, the location server can assign dwell time value zero to both station 704 and station 706. Based on dwell time value of zero, the location server can determine that an express train travels from station 702 to station 710 non-stop. In addition, the location server can determine that a signature characteristic of the express train is that the travel time between station 702 and 704 is shorter than normal as described in referenced to FIG. 7B, and the dwell time at stations 704 and 706 is zero.

The location server can provide connectivity data as described in both FIG. 7B and FIG. 7C to a user device. The user device can use the connectivity data to estimate a location of the user device and a time to destination. For example, if the user device determines that a travel time between station 702 and 704 is ten minutes, and, based on location fingerprint of station 704, that the user device has stayed at station 704 for one minute, the mobile device can determine that, 15 minutes later, the location of the mobile device will be less than halfway between station 704 and station 706, and that an estimated time to destination station 710 will be one minute remaining dwelling time at station 704 plus 30 minutes from station 704 to station 706, plus two minutes at station 706, plus 45 minutes to station 710, which is 78 minutes.

By comparison, if the user device determines that a travel time between station 702 and 704 is eight minutes, and the user device did not stop at station 704, the user device can determine that the user device is on an express train. The user device can determine that, 15 minutes after the train passes station 704, the mobile device will be more than half way between station 704 and station 706, and that the mobile device will reach destination station 710 in 25+40=65 minutes.

In some implementations, the location server can receive crowd-sourced survey data from multiple mobile devices whose users voluntarily participate in surveys. Using the crowd-sourced data, the location server can determine a pattern of the transit system, e.g., at what time of day the trains travel at what speed, frequency of delays, frequency of express trains, and varied dwell time at various time of day or day of week. The location server can determine connectivity of the transit system with enhanced granularity compared to surveying the transit system using a single sampling device.

Figure 8:
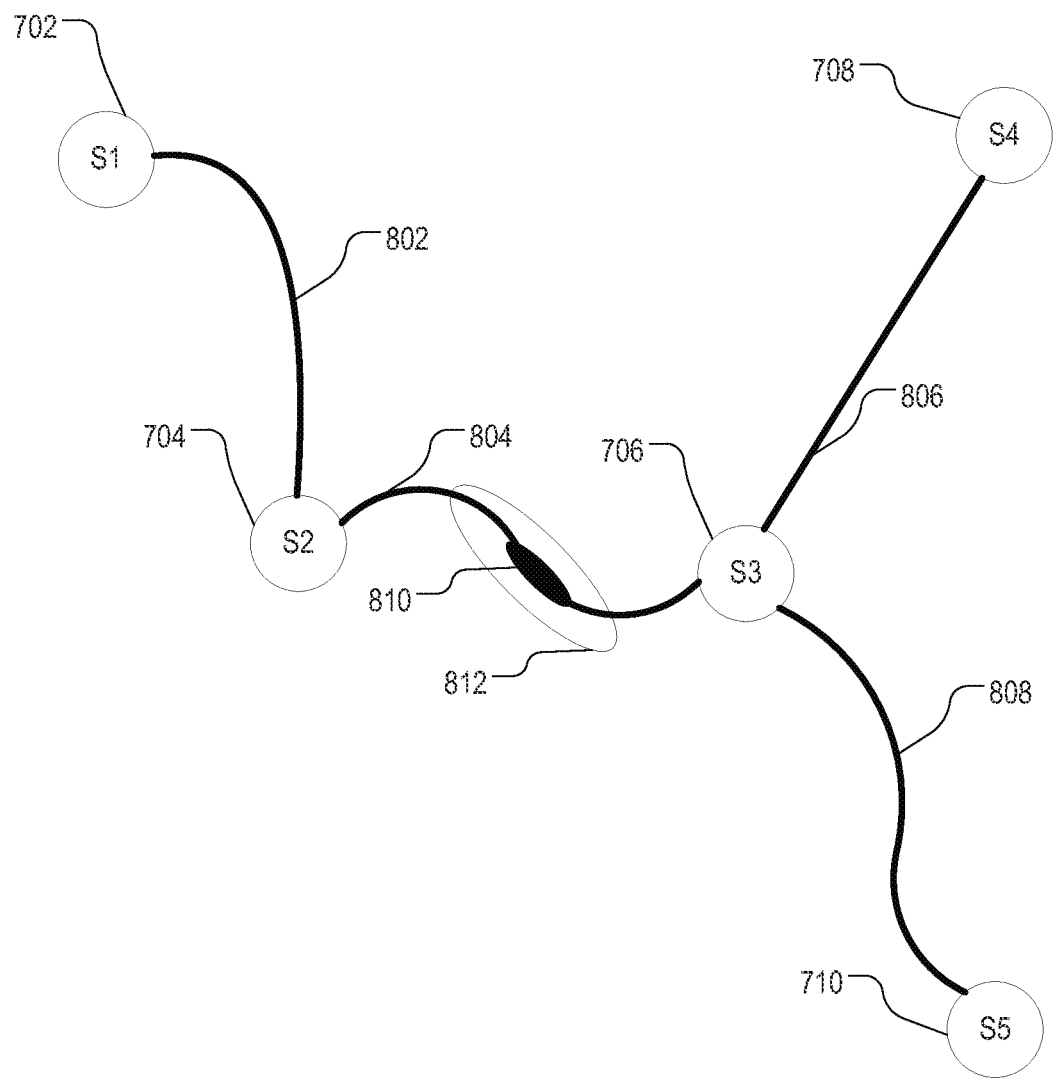
FIG. 8 illustrates a geometry shaped representation of connectivity.

FIG. 8 illustrates a geometry shaped representation of connectivity. In FIGS. 7A-7C, connections between stations 702, 704, 706, 708, and 710 are represented in schematic graphs. Stations 702, 704, 706, 708, and 710 can be represented on a geographical map.

Each of stations 702, 704, 706, 708, and 710 can be associated with geographic coordinates including longitude, latitude, and optionally, altitude coordinates. The altitude coordinates can indicate, for example, if the station is located underground or on an overpass. Tracks 802, 804, 806, and 808 that connect the stations may have various geometry represented by, for example, a series of longitude and latitude coordinates. The location server can perform "snap to route" calculations to map signals from a time dimension to a space dimension, including associating the temporal distance with physical distances along a geographic shape of the track.

After these calculations, a user device can determine an estimated geographic location based on temporal information. For example, at 15 minutes after departing from station 704, the user device can determine that the user device is midway between station 704 and station 706 based on characteristics of the transit system where the temporal distance between station 704 and station 706 is 30 minutes. Using this information, the user device can determine an estimated geographical location 810 of the user device. The user device can determine an error margin 812 associated with location 810. The error margin 812 can be presented as a one-dimensional margin along the track or an ellipse having a long axis along the track.

Figure 9:
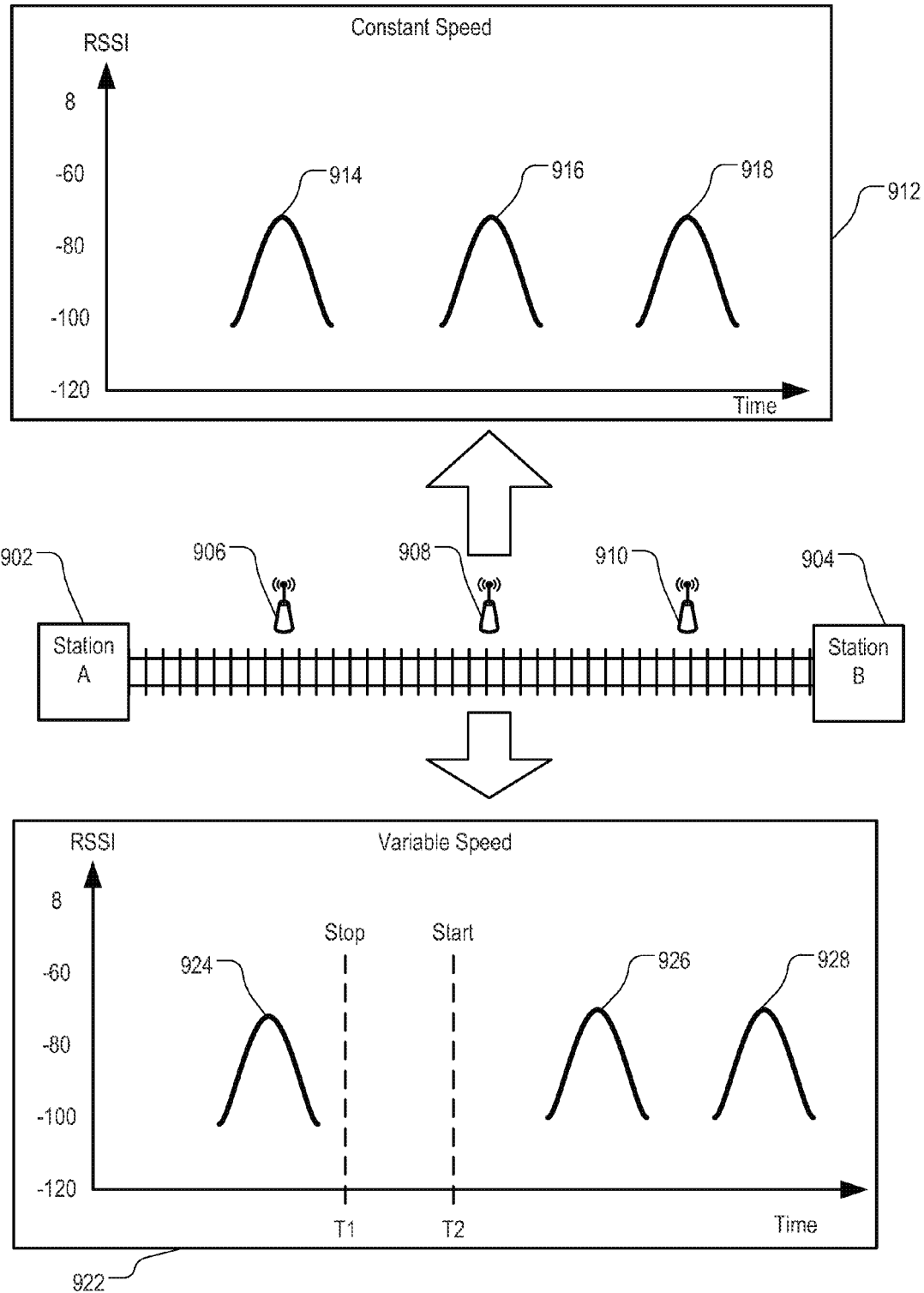
FIG. 9 illustrates exemplary techniques of mapping signal measurements from a time dimension to a space dimension using motion cues.

FIG. 9 illustrates exemplary techniques of mapping signal measurements from a time dimension to a space dimension using motion cues. During the time a sampling device travels from first station 902 to second station 904 of a transit system, the sampling device may detect signals from various signal sources, e.g., signal sources 906, 908, and 910. The sampling device may detect these signal sources when the signal sources 906, 908, and 910 are installed in a subway tunnel through which a train carrying the sampling device travels or when sections of a track between first station 902 and second station 904 are above ground. For illustrative purposes, signal sources 906, 908, and 910 are shown to be evenly spaced.

The sampling device, while traveling from first station 902 to second station 904, may detect signal pattern 912. Signal pattern 912 can include RSSI peaks 914, 916, and 918. Each of RSSI peaks 914, 916, and 918 can be associated with a unique signal source identifier, corresponding to signal sources 906, 908, and 910, respectively. RSSI peaks 914, 916, and 918 may be evenly spaced in a time dimension, where a temporal distance between RSSI peaks 914 and 916 is the same as a temporal distance between RSSI peaks 916 and 918. In addition, an accelerometer of the sampling device can determine that acceleration along a travel direction of the sampling device is zero or is below a detectable threshold. In response, the sampling device, or a location server receiving the signal measurements and accelerometer readings from the sampling device, can determine that a train carrying the sampling device travels at a constant speed, and that signal sources 906, 908, and 910 are evenly spaced in a space dimension.

The sampling device, while traveling from station 902 to station 904, may detect signal pattern 922. Signal pattern 922 can include RSSI peaks 924, 926, and 928. Each of RSSI peaks 924, 926, and 928 can be associated with a unique signal source identifier, corresponding to signal sources 906, 908, and 910, respectively. RSSI peaks 924, 926, and 928 may be unevenly spaced in a time dimension. For example, a temporal distance between RSSI peaks 924 and 926 may be greater than a temporal distance between RSSI peaks 926 and 928. In addition, based on readings from an accelerometer of the sampling device, the sampling device can determine that acceleration along a travel direction of the sampling device is non-zero or is above a specified detectable threshold. In response, the sampling device, or a location server receiving the signal measurements and accelerometer readings from the sampling device, can determine that a train carrying the sampling device travels at a variable speed. For example, based on the accelerometer readings, the sampling device or the location server can determine that the train stopped at time T1, and then started moving again at time T2, where both T1 and T2 are after detecting RSSI peak 924 and before RSSI peak 926. In response, the sampling device or location server can subtract the time between T1 and T2 from the temporal distance between RSSI peaks 924 and 926 in the time dimension. Then, upon determining that the remaining temporal distance between RSSI peaks 924 and 926 equals the temporal distance between RSSI peaks 926 and 928, sampling device or location server can determine that the signal sources 906, 908, and 910 are evenly spaced in a space dimension.

Figure 10:
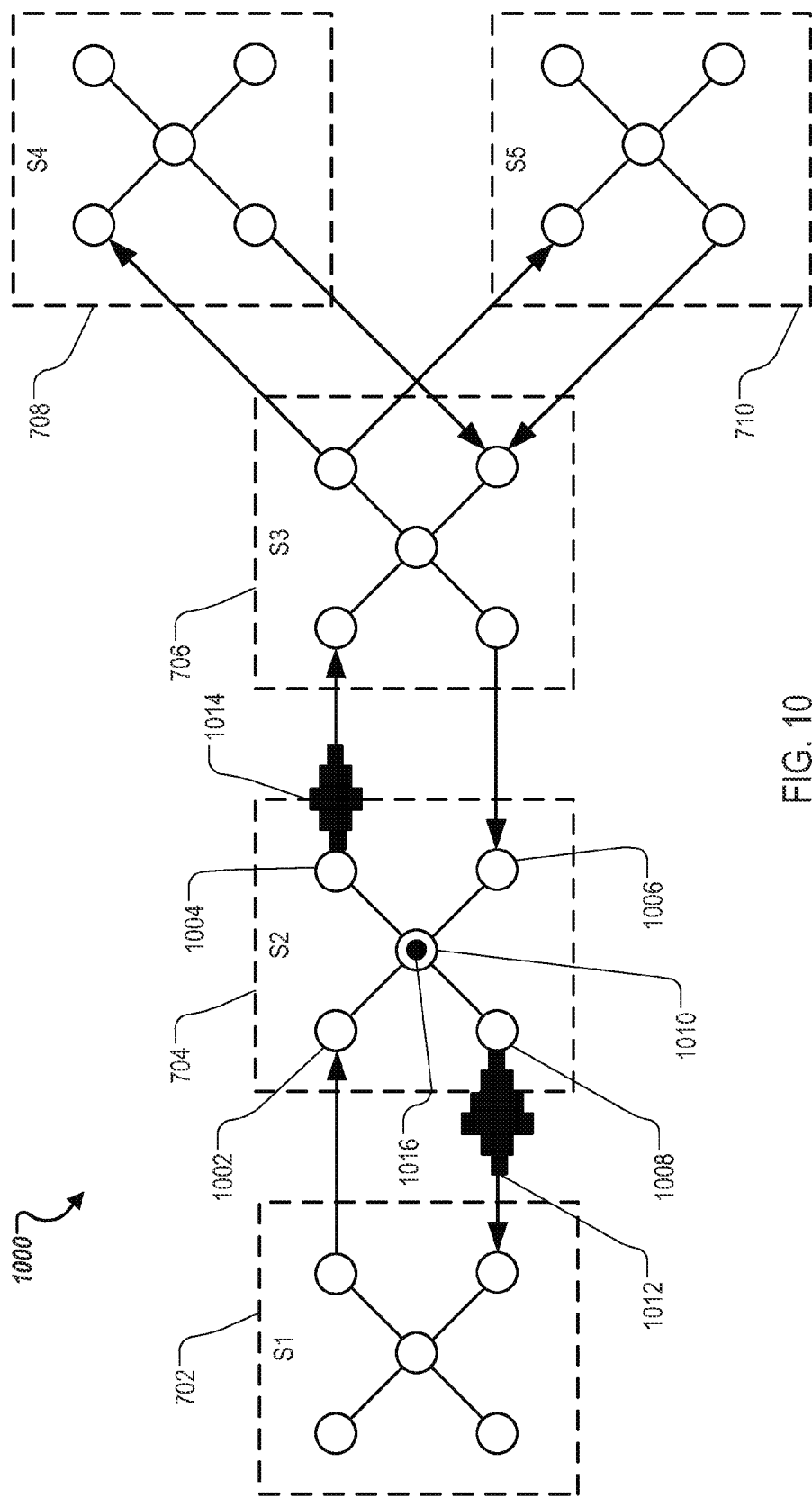
FIG. 10 illustrates an exemplary representation of a belief state of a transit system.

FIG. 10 illustrates an exemplary representation of a belief state of a transit system. The belief state of the transit system can include a probability distribution of a location of a mobile device in the transit system. The belief state can be represented in belief state graph 1000. In belief state graph 1000, each station in the transit system can be represented using multiple nodes. Each node can represent a point of a platform where a train enters, and a point of a platform where a train exits. For example, station 704 of the transit system can be represented by nodes including first platform inbound node 1002, first platform outbound node 1004, second platform inbound node 1006, and second platform outbound node 1008. In addition, the nodes representing station 704 can include station node 1010.

A location server, e.g., location server 214 of FIG. 2, can determine a probability distribution of a location of a mobile device in a transit system given connectivity of the transit system, predicted travel time between stations, and an initial state specifying where in the transit system the mobile device is located. For example, belief state graph 1000 can specify that if, at time t, e.g., 14:00:00, a mobile device is located on a train approaching the second platform of station 704, what are the probabilities at time t+1, t+2 . . . t+n (e.g., 14:01:00, 14:02:00 . . . ) the mobile device is located at various positions in the transit system.

For example, the mobile device may board an outbound train at the second platform, may stay at the second platform, may move to the first platform of the second station, or may move to the first platform and board an outbound train at the first platform. An exemplary probability distribution at time t+1 is shown in belief state graph 1000. Distribution 1012 represents probability that the mobile device is at various locations in a section of the transit system by riding an outbound train at the second platform of station 704 to station 702. Distribution 1012 can be represented as a set of vertical bars mapped to the section of the transit system. The size of each vertical bar represents the likelihood that the mobile device is located at a position that the width of the vertical bar occupies on the section of the transit system. Likewise, distribution 1014 can represent probabilities that the mobile device is located in a train outbound from the first platform at station 704 at various locations. Belief state graph 1000 can include marker 1016 representing a probability that, after the mobile device arrives at station 704, the mobile device stays at station 704.

The location server can map belief state graph 1000 to a geometry of the transit system. The location server can provided the mapped belief state graph 1000 to a user device. The user device can use the mapped belief state graph 1000 to determine an estimated location of the user device, even when the user device is traveling underground. The user device can provide a marker of the estimated location for display to a user.

Figure 11:
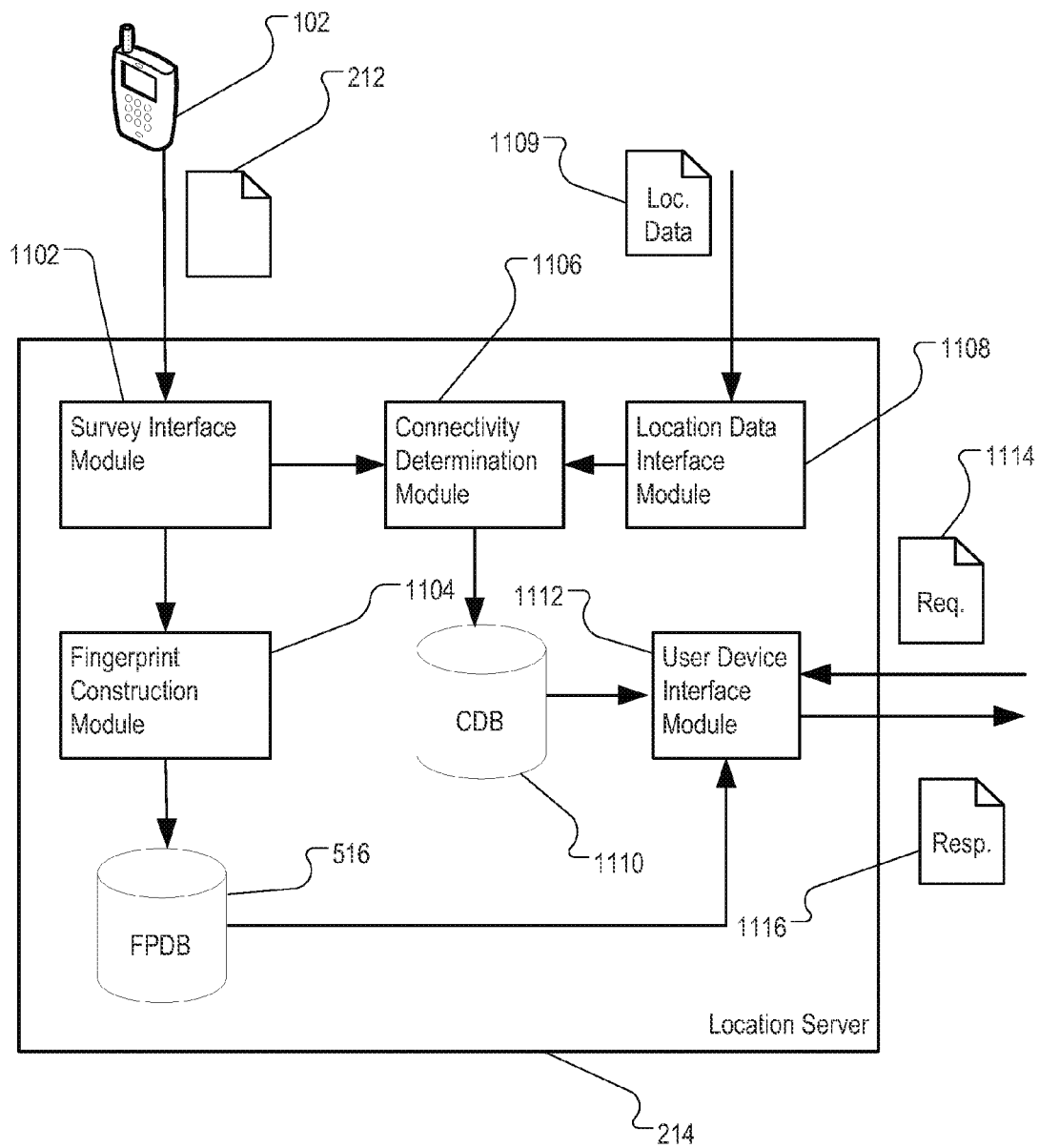
FIG. 11 is a block diagram of an exemplary location server.

FIG. 11 is a block diagram of exemplary location server 214. Location server 214 can include one or more computer processors programmed to perform tasks of various functional modules. Each functional module can include hardware components, software components, firmware components, or any combination of the above. Location server 214 can be implemented on a mobile device.

Location server 214 can include survey interface module 1102. Survey interface module 1102 is a component of location server 214 programmed to receive measurement data 212 from one or more sampling devices 202. In some implementations, survey interface module 1102 can receive measurement data 212 submitted anonymously from multiple sampling devices 202 in a crowd-sourcing mode. The measurement data 212 can include signal measurements for a first section of a transit system submitted by a first sampling device and signal measurements for a second section of a transit system submitted by a second sampling device. Survey interface module 1102 can stitch the sections and generate signal profiles for each station and route of the transit system, and submit the signal profiles to fingerprint construction module 1104.

Fingerprint construction module 1104 is a component of location server 214 programmed to determine patterns, if any, from the signal profiles submitted by survey interface module 1102 and select, from multiple statistical tools, an algorithm that is most efficient in determining a location fingerprint. Using that algorithm, fingerprint construction module 1104 can generate a location fingerprint for each station of the transit system, for each platform of the station, and for each section of the transit system that is between two stations. Fingerprint construction module 1104 then stores the location fingerprints in location fingerprint database 516.

In addition to submitting signal profiles to fingerprint construction module 1104, survey interface module 1102 can submit signal profiles to connectivity determination module 1106. Connectivity determination module 1106 is a component of location server 214 programmed to determine connectivity of a transit system from signal profiles received from survey interface module 1102 and geographic data. Determining connectivity of the transit system can include determining belief states of the transit system usable for estimating a location of a mobile device when the mobile device is in the transit system.

Location server 214 can include location data interface module 1108. Location data interface module 1108 is a component of location server 214 programmed to receive location data 1109 from various information sources. The location data can include geographic coordinates of stations of a transit system and geometry of routes of the transit system. Location data interface module 1108 can provide location data 1109 to connectivity determination module 1106 for performing "snap to route" operations, including mapping the measurements in the signal profile from a time dimension to a space dimension and adding geometry, including way points defined by latitude and longitude coordinates, to the belief state. Output of connectivity determination module 1106 can be stored in connectivity database 1110.

Location server 214 can include user device interface module 1112. User device interface module 1112 is a component of location server 214 programmed to receive request 1114 from a user device. The request can include one or more identifiers of transit systems. In some implementations, the request includes a geographic location of the user device. User device interface module 1112 can determine, using data stored in a transit information database, transit systems available in a region, e.g., a city, that includes the geographic location. These transit systems can include, for example, subway lines, bus lines, trains, light rails, or hotel or airport shuttles. User device interface module 1112 can retrieve, using identifiers of these transit systems, location fingerprint data from location fingerprint database 516 and connectivity data from connectivity database 1110. User device interface module 1112 can provide the retrieved location fingerprint data and connectivity data to the user device as response 1116 to the request 1114.

Figure 12:
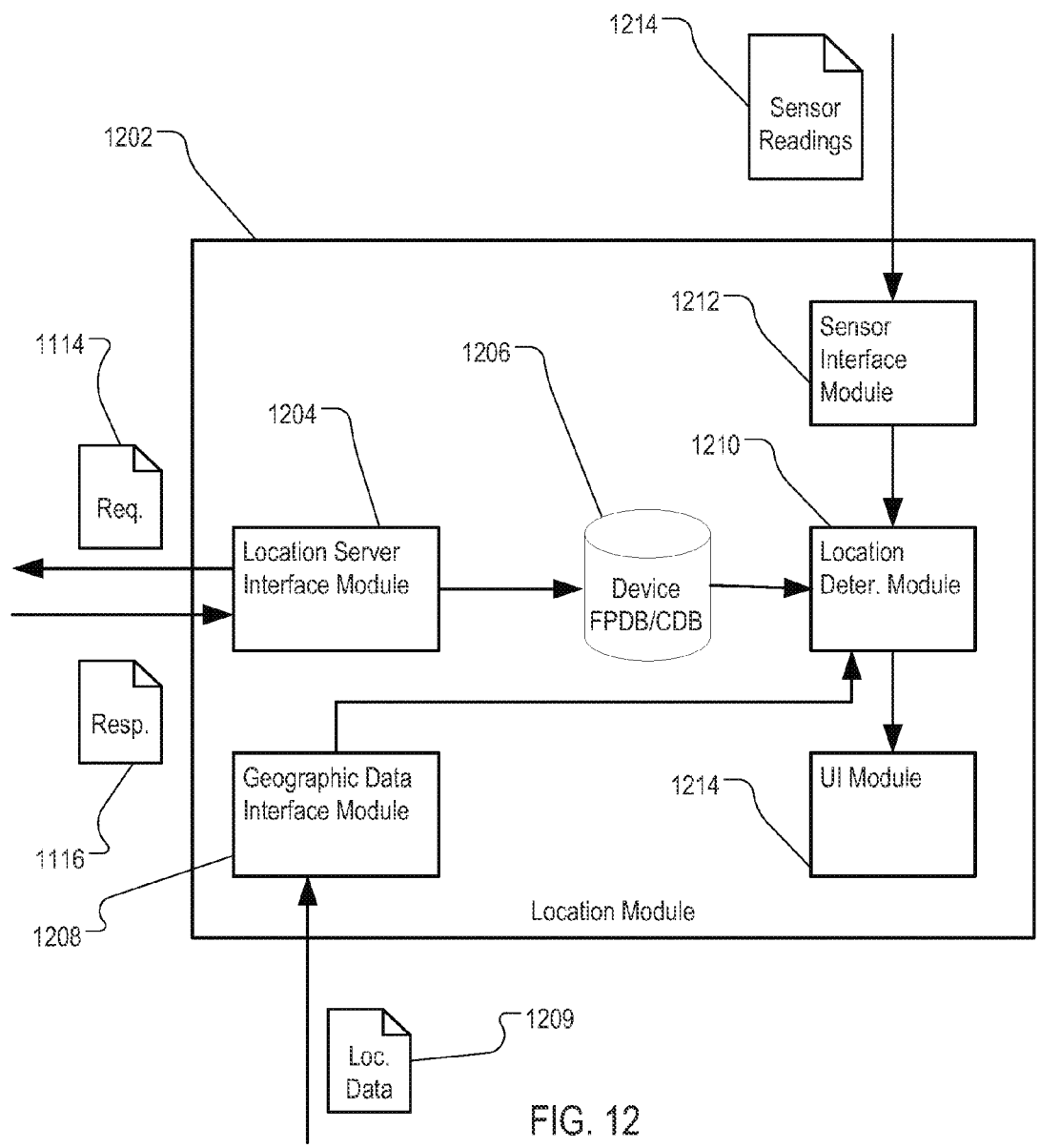
FIG. 12 is a block diagram of an exemplary user device using location fingerprint data.

FIG. 12 is a block diagram of exemplary user device 1202 using location fingerprint data. User device 1202 can include one or more computer processors programmed to perform tasks of various functional modules. Each functional module can include hardware components, software components, firmware components, or any combination of the above.

User device 1202 can include location server interface module 1204. Location server interface module 1204 is a component of user device 1202 programmed to submit request 1114 to a location server, e.g., location server 214 of FIG. 2. Location server interface module 1204 can submit request 1114 upon a user request, or upon a request by an application program executing on user device 1202. The application program can be a map application or a route recommendation application.

Location server interface module 1204 can receive response 1116 from the location server. Location server interface module 1204 can store location fingerprint data and transit connectivity data in response 1116 in device-side location information database 1206. Device-side location information database 1206 can store location fingerprint data and transit connectivity data that are specific to user device 1202, e.g., the location fingerprint data and transit connectivity data of a transit system as selected by a user of user device 1202 or are available in a current city where user device 1202 is located.

User device 1202 can include geographic data interface module 1208. Geographic data interface module 1208 is a component of user device 1202 programmed to interface with a map server to obtain geographic data 1209 for generating a virtual map of a geographic area. The geographic data can include locations of stations of transit systems in the geographic area, and route geometry of the transit system. Geographic data interface module 1208 can provide the geographic data to location determination module 1210.

Location determination module 1210 is a component of user device 1202 configured to determine an estimated location of user device 1202, or predict a future location of user device 1202, using location fingerprint data and transit connectivity data stored in device-side location information database 1206. To determine the estimated location or predict the future location, location determination module 1210 can receive sensor data from sensor interface module 1212, and match the sensor data to the location fingerprint data and the transit connectivity data.

Sensor interface module 1212 is a component of user device 1202 configured to receive sensor readings 1214 from one or more sensors coupled to user device 1202. These sensors can include, for example, RF signal receivers, barometers, sound sensors, motion sensors, magnetometers, or light sensors. Sensor interface module 1212 can provide readings of these sensors to location determination module 1210.

Using the fingerprint data and connectivity data stored in the device-side location fingerprint database 1206, geographic data from geographic data interface module 1208, and sensor readings 1214 to determine an estimated geographic location of user device 1202.

Exemplary Processes

Figure 13:
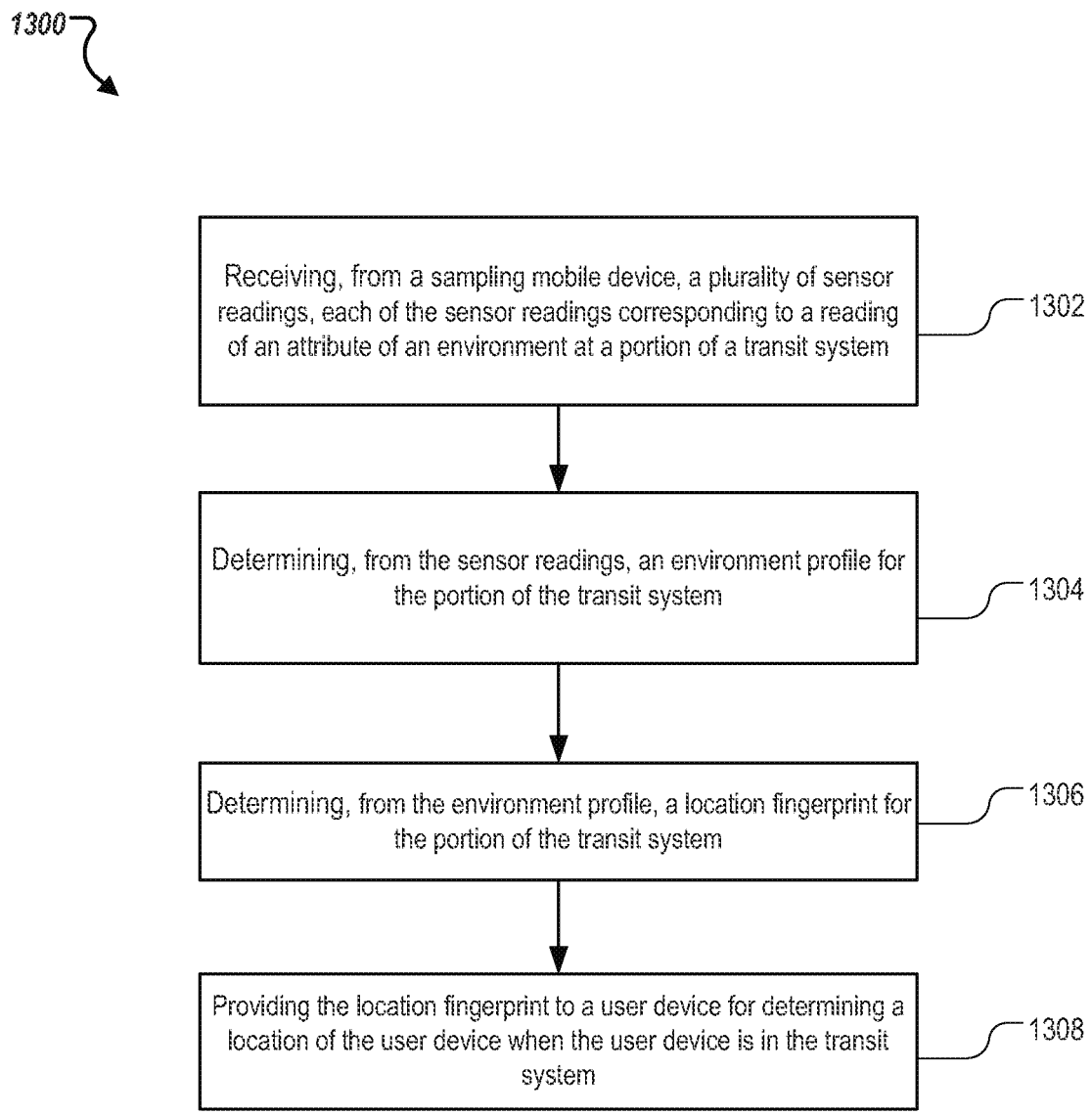
FIG. 13 is a flowchart of an exemplary procedure of generating location fingerprint data.

FIG. 13 a flowchart of an exemplary procedure 1300 of generating location fingerprint data. Procedure 1300 can be performed by a location server, e.g., location server 214 of FIG. 2.

The location server can receive (1302) sensor readings from a sampling device, e.g., sampling device 202 of FIG. 2. Each of the sensor readings can correspond to a reading of an attribute of an environment at a portion of a transit system taken during a survey. The portion of the transit system can include a station of the transit system or at least a portion of a route of the transit system. The transit system can be a subway system where signals from a global positioning satellite system are unavailable or inaccurate for location determination.

The sensor readings can include readings from at least one of an accelerometer, a magnetometer, a barometer, a gyroscope, a light sensor, a sound pressure sensor, or a radio receiver coupled to the sampling device. In some implementations, the sensor readings are measurements of strength of radio RF signals of a signal source that are detectable at the portion of the transit system. The signal source can be a cell site of a cellular communications network, a wireless access point, or a Bluetooth™ low energy (BLE) beacon. Each measurement can be associated with an identifier of a corresponding signal source. The identifiers can be MAC addresses of the signal sources.

The survey can be an in-station survey performed at a station of the transit system that includes one or more platforms. The sensor readings can include multiple measurements taken at each of the platforms. The measurements can be associated with an identifier of the station and an identifier of the platform where the signal measurements are taken.

The survey can be a ride-the-line survey performed on a train traveling on a section of a rail of the transit system. Each of the sensor readings can be associated with a tag indicating whether a surveyor carrying the sampling device is in the train and remains stationary relative to the train, whether the surveyor is walking on the train, whether the train is moving along the rail, whether the train is accelerating or decelerating, and whether the train has stopped at a station.

The location server can determine (1304), from the sensor readings, an environment profile for the portion of the transit system. The environment profile comprising a distribution of frequency of a number of occurrences of each particular value among the sensor readings over values of the readings. The environment profile is representable by a discrete representation of one or more histograms. Each histogram can correspond to a signal source. Each histogram can have bins of measured signal strengths of the corresponding signal source. Each histogram can have frequencies corresponding to occurrences of measurements at each signal strength. The environment profile is representable by a continuous probability density representation, e.g., a best-fit Rayleigh distribution.

The location server can determine (1306), from the environment profile, a location fingerprint for the portion of the transit system. The location fingerprint can include projected readings of sensors of a mobile device when the mobile device is located at the portion of the transit system. Determining the location fingerprint can include determining, from each histogram or continuous probability density representation in the environment profile, a number of modes, each mode corresponding to a local maximum number of occurrences at a corresponding signal strength measured from a corresponding signal source. The location server can select an algorithm optimized for single mode statistical filtering upon determining that the histogram has one mode, or selecting an algorithm optimized for multi-mode statistical filtering upon determining that the histogram has a plurality of modes. The system can determine the location fingerprint at least in part by applying the selected algorithm to the respective histogram.

The location server can provide (1308) the location fingerprint to a user device for determining a location of the user device when the user device is in the transit system. The location fingerprint can be associated with an identifier of an operator of the transit system and at least one of a name of the station or geographic coordinates of the portion of the route. Providing the location fingerprint to a user device can include receiving a request from the user device for location fingerprint data of the transit system. The request can include an identifier of the transit system, e.g., "number one line." In response to the request, the location server can provide the location fingerprint to the user device. The request can include a location of the user device. In response, the location server can provide to the requesting user device location fingerprint data for some or all transit systems in a city where the requesting user device is located.

Figure 14:
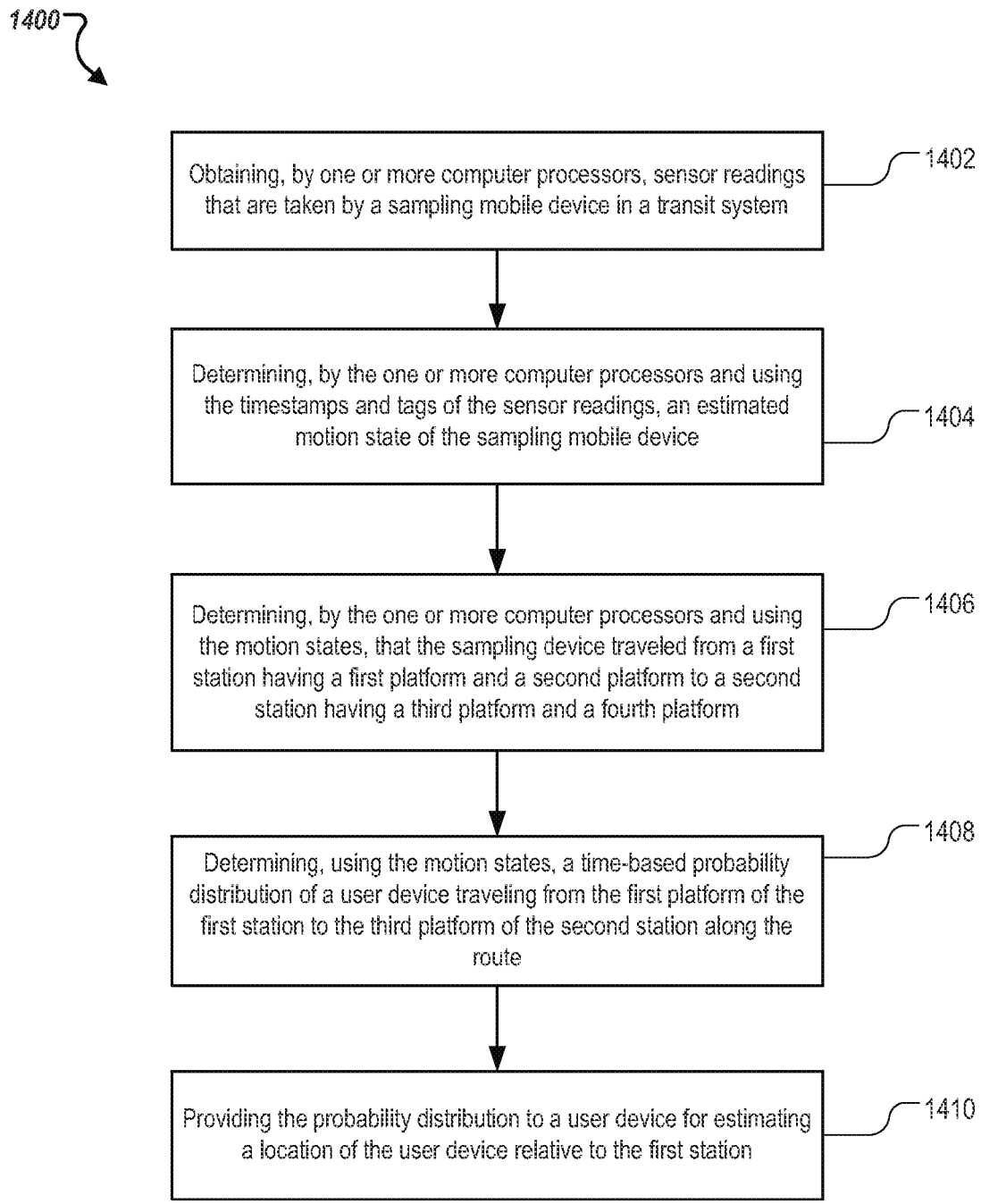
FIG. 14 is a flowchart of an exemplary procedure of determining connectivity of a transit system.

FIG. 14 is a flowchart of an exemplary procedure 1400 of determining connectivity of a transit system. Procedure 1400 can be performed by a location server, e.g., location server 214 of FIG. 2.

The location server can obtain (1402) sensor readings that are taken by a sampling device in a transit system that includes a route, stations on the route, and one or more platforms at each station. Each sensor reading can be associated with a timestamp and a tag indicating on which portion of the transit system the reading was taken. The sensor readings can be readings of inertial sensor indicating motion states of the sampling device. The inertial sensor can include an accelerometer or a gyroscope.

The sensor readings can include measurements taken at the first platform and the third platform, each measurement is associated with an identifier of a signal source. Each tag can include an identifier of the platform and an identifier of the station where the measurements are taken. Each tag can include an indication whether a surveyor carrying the sampling device is in a train and remains stationary relative to the train, whether the surveyor is walking on the train, whether the train is moving along the rail, whether the train is accelerating or decelerating, and whether the train has stopped at a station.

The location server can determine (1404), using the timestamps and tags of the sensor readings, an estimated motion state of the sampling device at each of multiple time points when the sampling device traveled in the transit system. The estimated motion state can include whether the sampling is accelerating or decelerating linearly, a rate of acceleration and deceleration, a motion speed, a change of direction, and a rate of direction change.

The location server can determine (1406), using the motion states, that the sampling device traveled from a first station having a first platform and a second platform to a second station having a third platform and a fourth platform through a directed route connecting the first platform of the first station and the third platform of the second station. Determining that the sampling device traveled from a first platform of the first station can include, upon determining that a combination of first sensor readings indicates that the sampling device went from above ground to underground at a geographic location of the first station, determining that the sampling device entered the first platform of the first station using a combination of second sensor readings.

For example, the location server, or sampling device, can determine that the mobile device entered an underground station upon determining an increase in air pressure, a decrease in light, and a loss of GPS signals. The last known location, according to the GPS signals, can match a location of the first station as stored in a location database. The location server can then determine that a radio receiver of the sampling device detected a signal pattern of RSSIs of one or more access points that matches a location fingerprint associated with the first platform by matching the signal patterns with location fingerprints of various parts of the first station.

Determining that the sampling device traveled to the third platform of the second station can include, upon determining that a combination of second sensor readings indicate that the sampling device is located at the third platform of the second station, determining that the sampling device went from underground to above ground at the second station using a combination of first sensor readings.

For example, the location server, or sampling device can determine that, based on accelerometer readings, a train carrying the sampling device is slowing down. The sampling device can then detect RF signals. The sampling device can match the RSSIs of the detected signals with location fingerprint associated with stations that are next stations of the first station. Based on the match, the location server, or sampling device can determine that the sampling device reached the third platform of the second station. A change in air pressure or a detection of GPS signals can indicate that the sampling device exited the third station.

The location server can determine (1408), using the motion states, a time-based probability distribution of location of a user device traveling from the first platform of the first station to the third platform of the second station along the route and a probability distribution of time mobile devices staying on the first platform or the third platform. Determining the time-based probability distribution of the location of the user device can include converting a sequence of measurements from a time dimension to a space dimension by associating the timestamps with the inertial sensor readings. The location server can then determine the time-based probability distribution of the location of the user device over time since the user device leaves the first platform based on the converted sequence of measurements. The location server, or the user device, can overlay a representative of the location of the user device and a representation of the transit system on a map.

The location server can provide (1410) the probability distribution to a user device for estimating a location of the user device relative to the transit system. The request can include an identifier of the transit system, e.g., number one line. In response to the request, the location server can provide the location fingerprint to the user device. The request can include a location of the user device. In response, the location server can provide to the requesting user device location fingerprint data for some or all transit system in a city where the requesting user device is located.

Figure 15A:
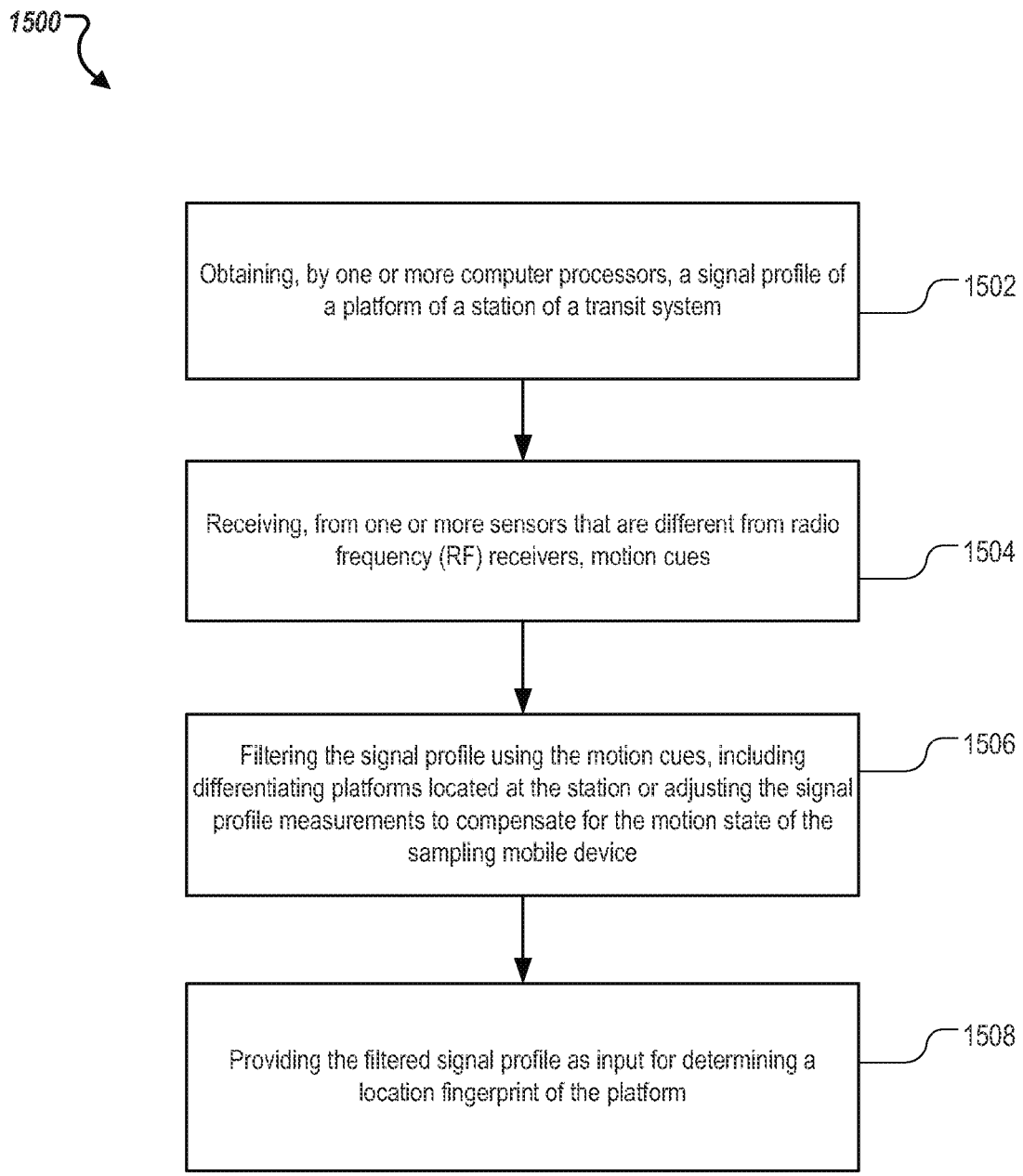
FIG. 15A is a flowchart of an exemplary procedure of improving location fingerprint data using motion cues in an in-station survey.

FIG. 15A is a flowchart of exemplary procedure 1500 of improving location fingerprint data using motion cues in an in-station survey. Procedure 1500 can be performed by a location server, e.g., location server 214 of FIG. 2.

The location server can obtain (1502) a signal profile of a platform of a station of a transit system, the signal profile comprising a plurality of signal measurements, each of the signal measurements being taken by a sampling device and corresponding to a signal source detected on the platform. The platform can be located in a subway system where signals from a global positioning satellite system are unavailable or inaccurate for location determination. The signal source can be a cell site of a cellular communications network, a wireless access point, or a BLE beacon. Each measurement is associated with an identifier of a corresponding signal source.

The location server can receive (1504), from one or more sensors that are different from RF receivers, motion cues. The motion cues can indicate a motion state of the sampling device on the platform. Each motion cue can be associated with a signal measurement in the signal profile. For example, the motion cues can indicate that the sampling device enters or leaves the platform by moving from one floor of the station to another floor. The one or more sensors can include a magnetometer, a barometer, a light sensor, a sound level sensor, an accelerometer, a gyroscope, or any combination of these sensors.

The location server can filter (1506) the signal profile using the motion cues, including differentiating platforms located at the station or adjusting the signal profile measurements to compensate for the motion state of the sampling device. For example, the sampling device can include a motion sensor and a barometer. The location server can determine a probability that the sampling device moved from a first floor to a second floor of the station based on readings of the motion sensor indicating that the sampling device moved horizontally and a change of readings from the barometer indicating that the sampling device moved vertically. In various in-station surveys, the first floor can be above ground, the second floor can be underground, or vice versa. Both the first floor and the second floor can be underground. The location server can determine that the platform is located on the first floor. The location server can determine that the probability exceeds a threshold value, indicating that the platform located on the first floor is different from a second platform located on the second floor.

In some implementations, filtering the signal profile can include removing first measurements associated with a magnetometer reading change and an air pressure reading change that, in combination, indicate that a train entered or exited the station at the time the first measurements were taken. Filtering the signal profile can include removing first measurements associated with a light sensor reading change and a sound level sensor reading change that, in combination, indicate that a train entered or exited the station at the time the first measurements were taken.

The location server can provide (1508) the filtered signal profile as input for determining a location fingerprint of the platform. A user device can use the location fingerprint to determine a location of the user device within the transit system.

Figure 15B:
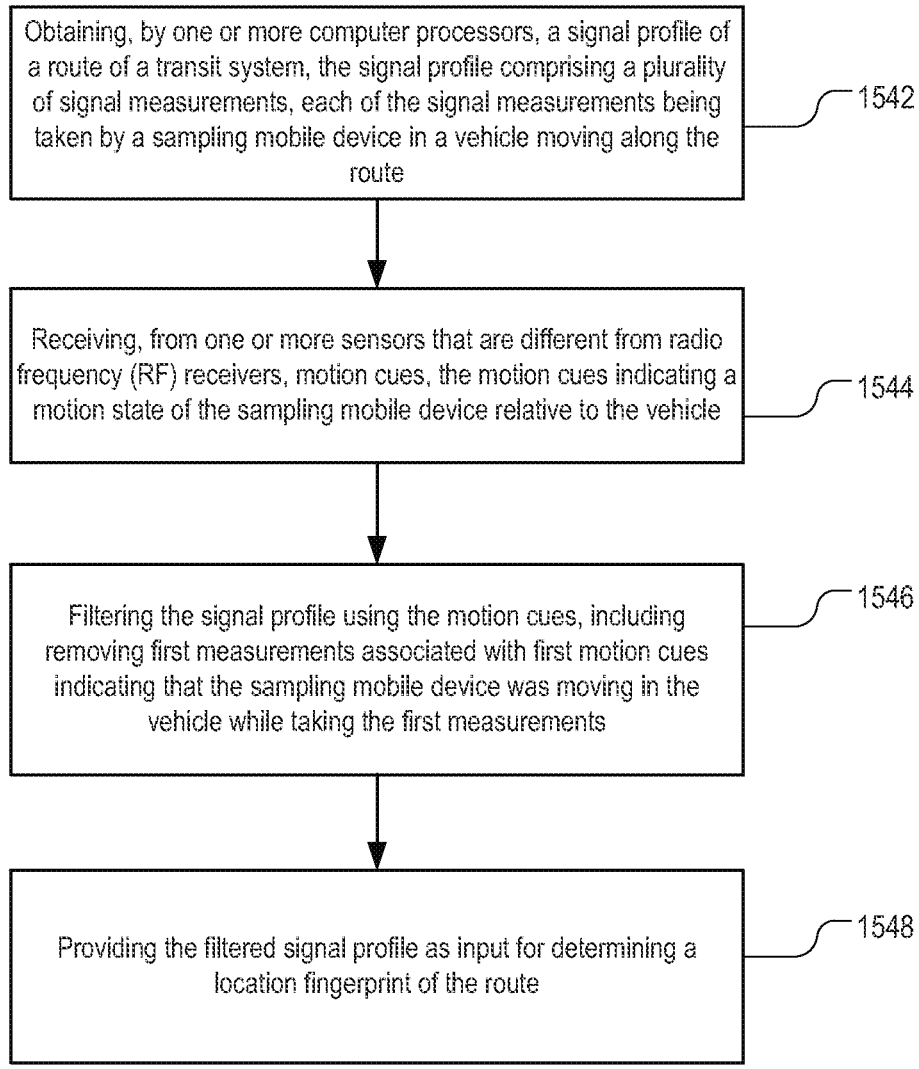
FIG. 15B is a flowchart of an exemplary procedure of improving location fingerprint data using motion cues and a ride-the-line survey.

FIG. 15B is a flowchart of exemplary procedure 1540 of improving location fingerprint data using motion cues and a ride-the-line survey. Procedure 1540 can be performed by a location server, e.g., location server 214 of FIG. 2.

The location server can obtain (1542) a signal profile of a route of a transit system. The signal profile can include multiple signal measurements. Each of the signal measurements can be taken by a sampling device in a vehicle moving along the route. Each of the signal measurements corresponding to a signal source is detected in the vehicle by the sampling device. The vehicle can be a train. The signal measurements can be RSSIs of RF signals from a cell site of a cellular communications network, a wireless access point, or a BLE beacon. Each measurement can be associated with an identifier, e.g., MAC address, of a signal source. The signal profile can include negative information, the negative information including lack of signals. For example, a portion of the signal profile can include measurements taken when a train is traveling in an underground tunnel and between stations. No RF signal was detected in the tunnel.

The location server can receive (1544), from one or more sensors that are different from radio frequency (RF) receivers, motion cues. The motion cues can indicate a motion state of the sampling device relative to the vehicle. Each motion cue can be associated with a signal measurement in the signal profile by time. If the signal measurement is negative, e.g., no signal is detected, a motion cue can be associated with a null signal measurement.

The location server can filter (1546) the signal profile using the motion cues, including removing first measurements associated with first motion cues indicating that the sampling device was moving in the vehicle while taking the first measurements.

The location server can provide (1548) the filtered signal profile as input for determining a location fingerprint of the route. A user device can use the location fingerprint to determine a location of the user device within the transit system. In some implementations, the location server can determine a sensor reading profile indicating a projected inertial sensor reading or a non-inertial sensor reading of the user device when the sampling device is located in a vehicle traveling on the route approaching or departing a station of the transit system or in between approaching and departing a station. The location server can associate the signal fingerprint for the route and the sensor reading profile to generate a multi-sensor fingerprint. The location server can provide the multi-sensor fingerprint to the user device for determining a location of the mobile device relative to the transit system. The inertial sensor reading can include a reading from an accelerometer or gyroscope. The non-inertial sensor reading includes a reading from a light sensor, a sound level sensor, a barometer sensor, or a magnetometer.

Exemplary System Architecture

Figure 16:
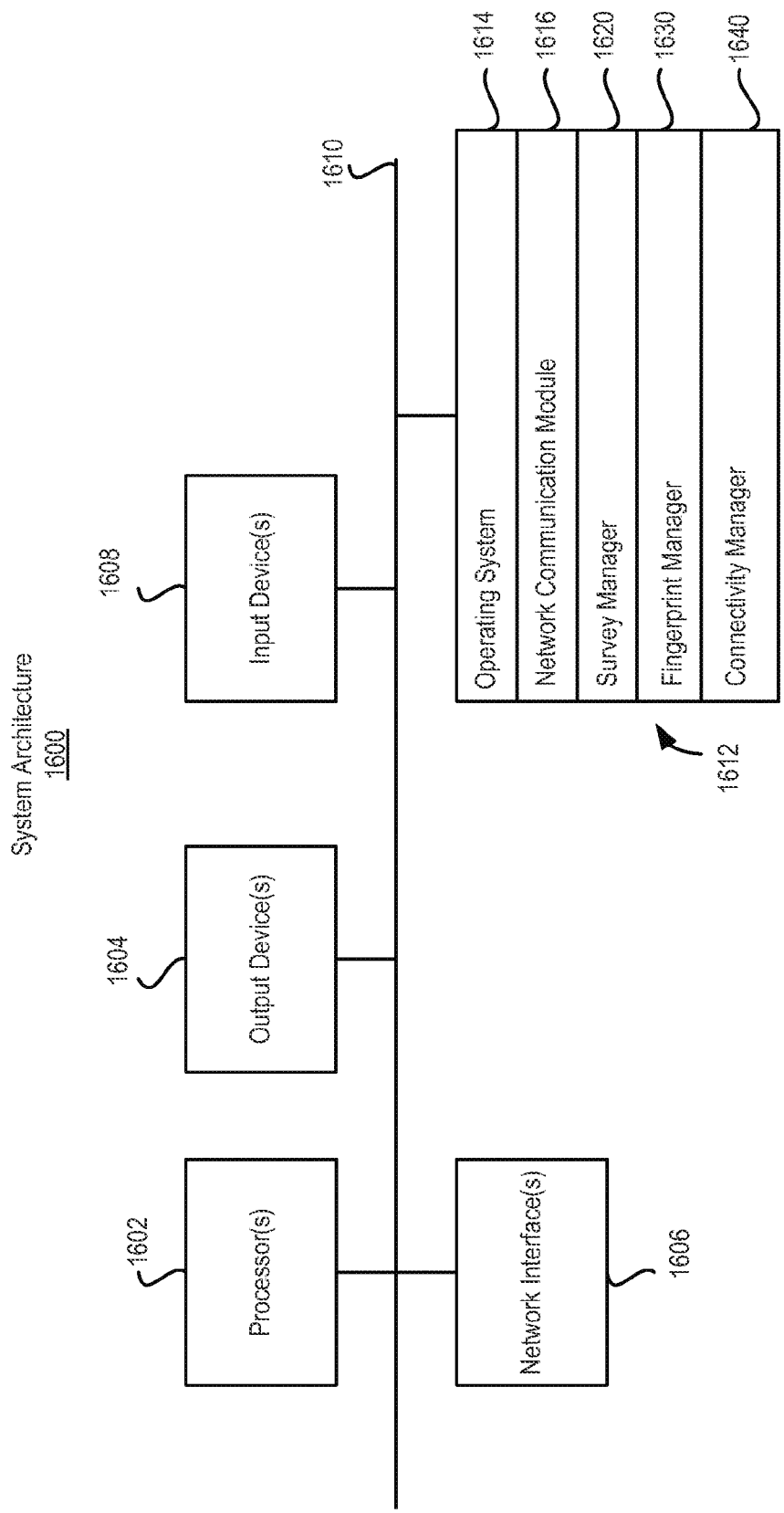
FIG. 16 is a block diagram of an exemplary system architecture for implementing the features and operations of FIGS. 1-15.

FIG. 16 is a block diagram of an exemplary system architecture for implementing the features and operations of FIGS. 1-15. Other architectures are possible, including architectures with more or fewer components. In some implementations, architecture 1600 includes one or more processors 1602 (e.g., dual-core Intel® Xeon® Processors), one or more output devices 1604 (e.g., LCD), one or more network interfaces 1606, one or more input devices 1608 (e.g., mouse, keyboard, touch-sensitive display) and one or more computer-readable mediums 1612 (e.g., RAM, ROM, SDRAM, hard disk, optical disk, flash memory, etc.). These components can exchange communications and data over one or more communication channels 1610 (e.g., buses), which can utilize various hardware and software for facilitating the transfer of data and control signals between components.

The term "computer-readable medium" refers to a medium that participates in providing instructions to processor 1602 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1612 can further include operating system 1614 (e.g., a Linux® operating system), network communication module 1616, survey manager 1620, fingerprint manager 1630, and connectivity manager 1640. Operating system 1614 can be multi-user, multiprocessing, multitasking, multithreading, real time, etc. Operating system 1614 performs basic tasks, including but not limited to: recognizing input from and providing output to devices 1606, 1608; keeping track and managing files and directories on computer-readable mediums 1612 (e.g., memory or a storage device); controlling peripheral devices; and managing traffic on the one or more communication channels 1610. Network communications module 1616 includes various components for establishing and maintaining network connections (e.g., software for implementing communication protocols, such as TCP/IP, HTTP, etc.).

Survey manager 1620 can include computer instructions that, when executed, cause processor 1602 to provide survey instructions and maps to a sampling device (e.g., sampling device 202 of FIG. 2) and receive survey data from the sampling device. Fingerprint manager 1630 can include computer instructions that, when executed, cause processor 1602 to perform operations of fingerprint construction module 1104 as described above in reference to FIG. 11. Connectivity manager 1640 can include computer instructions that, when executed, cause processor 1602 to perform operations of connectivity determination module 1106 as described above in reference to FIG. 11.

Architecture 1600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Exemplary Mobile Device Architecture

Figure 17:
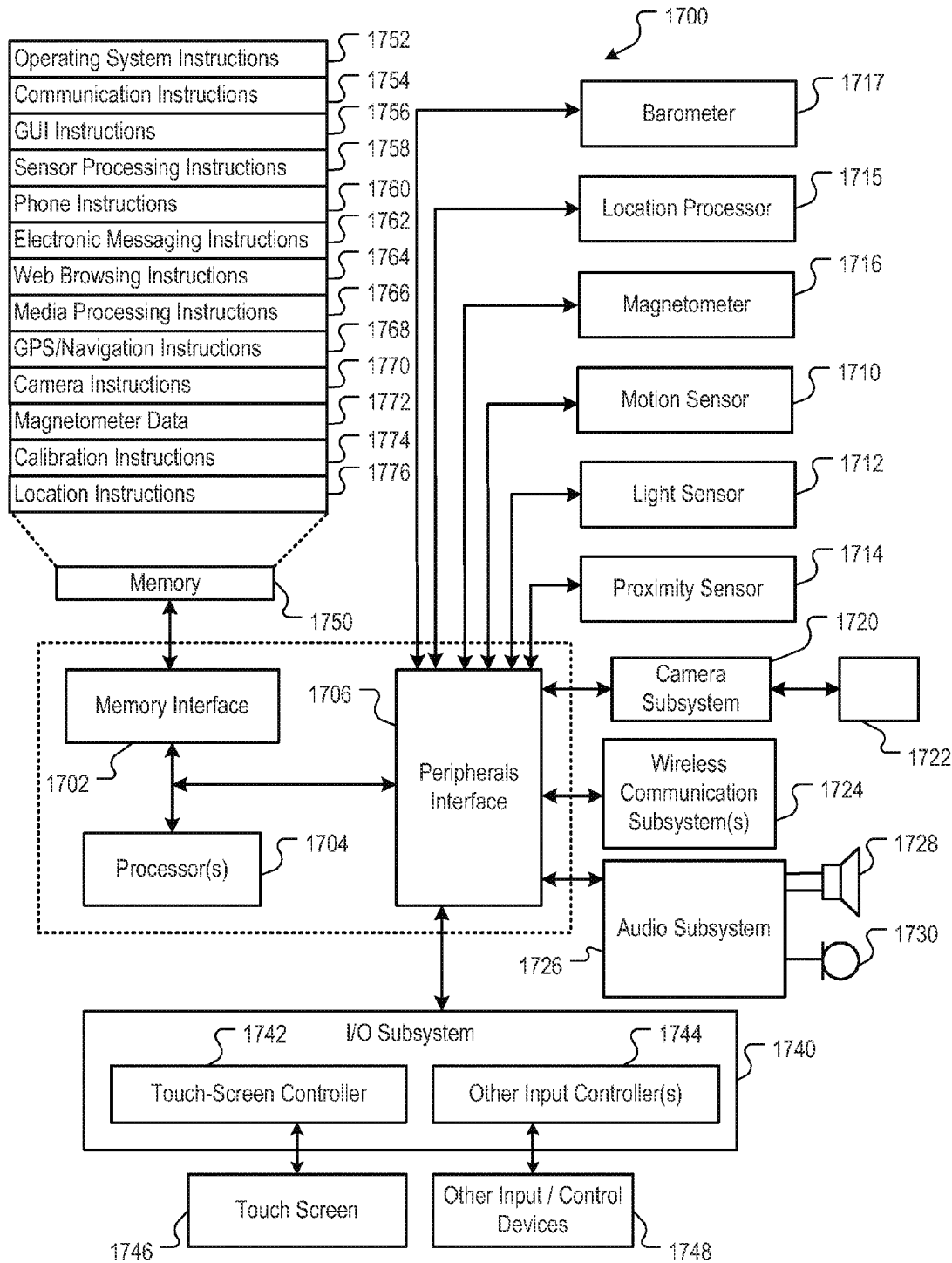
FIG. 17 is a block diagram illustrating an exemplary device architecture of a mobile device implementing the features and operations described in reference to FIGS. 1-15.

FIG. 17 is a block diagram of an exemplary architecture 1700 for the mobile devices of FIGS. 1-15. A mobile device (e.g., sampling device 202 of FIG. 2 or mobile device 102 of FIG. 1) can include memory interface 1702, one or more data processors, image processors and/or processors 1704, and peripherals interface 1706. Memory interface 1702, one or more processors 1704 and/or peripherals interface 1706 can be separate components or can be integrated in one or more integrated circuits. Processors 1704 can include application processors, baseband processors, and wireless processors. The various components in the mobile device, for example, can be coupled by one or more communication buses or signal lines.

Sensors, devices, and subsystems can be coupled to peripherals interface 1706 to facilitate multiple functionalities. For example, motion sensor 1710, light sensor 1712, and proximity sensor 1714 can be coupled to peripherals interface 1706 to facilitate orientation, lighting, and proximity functions of the mobile device. Location processor 1715 (e.g., GPS receiver) can be connected to peripherals interface 1706 to provide geopositioning. Electronic magnetometer 1716 (e.g., an integrated circuit chip) can also be connected to peripherals interface 1706 to provide data that can be used to determine the direction of magnetic North. Thus, electronic magnetometer 1716 can be used as an electronic compass. Motion sensor 1710 can include one or more accelerometers configured to determine change of speed and direction of movement of the mobile device. Barometer 1717 can include one or more devices connected to peripherals interface 1706 and configured to measure pressure of atmosphere around the mobile device.

Camera subsystem 1720 and an optical sensor 1722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1724, which can include radio frequency receivers and/or optical (e.g., infrared) receivers and transmitters. The specific design and implementation of the communication subsystem 1724 can depend on the communication network(s) over which a mobile device is intended to operate. For example, a mobile device can include communication subsystems 1724 designed to operate over a GSM network, a GPRS network, an EDGE network, a Wi-Fi™ or WiMax™ network, and a Bluetooth™ network. In particular, the wireless communication subsystems 1724 can include hosting protocols such that the mobile device can be configured as a base station for other wireless devices.

Audio subsystem 1726 can be coupled to a speaker 1728 and a microphone 1730 to facilitate voice-enabled functions, such as voice recognition, voice replication, digital recording, and telephony functions. Audio subsystem 1726 can be configured to receive voice commands from the user.

I/O subsystem 1740 can include touch screen controller 1742 and/or other input controller(s) 1744. Touch-screen controller 1742 can be coupled to a touch screen 1746 or pad. Touch screen 1746 and touch screen controller 1742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 1746.

Other input controller(s) 1744 can be coupled to other input/control devices 1748, such as one or more buttons, rocker switches, thumb-wheel, infrared port, USB port, and/or a pointer device such as a stylus. The one or more buttons (not shown) can include an up/down button for volume control of speaker 1728 and/or microphone 1730.

In one implementation, a pressing of the button for a first duration may disengage a lock of the touch screen 1746; and a pressing of the button for a second duration that is longer than the first duration may turn power to the mobile device on or off. The user may be able to customize a functionality of one or more of the buttons. The touch screen 1746 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player. The mobile device may, therefore, include a pin connector that is compatible with the MP3 player. Other input/output and control devices can also be used.

Memory interface 1702 can be coupled to memory 1750. Memory 1750 can include high-speed random access memory and/or non-volatile memory, such as one or more magnetic disk storage devices, one or more optical storage devices, and/or flash memory (e.g., NAND, NOR). Memory 1750 can store operating system 1752, such as Darwin, RTXC, LINUX, UNIX, OS X, WINDOWS, iOS, or an embedded operating system such as VxWorks. Operating system 1752 may include instructions for handling basic system services and for performing hardware dependent tasks. In some implementations, operating system 1752 can include a kernel (e.g., UNIX kernel).

Memory 1750 may also store communication instructions 1754 to facilitate communicating with one or more additional devices, one or more computers and/or one or more servers. Memory 1750 may include graphical user interface instructions 1756 to facilitate graphic user interface processing; sensor processing instructions 1758 to facilitate sensor-related processing and functions; phone instructions 1760 to facilitate phone-related processes and functions; electronic messaging instructions 1762 to facilitate electronic-messaging related processes and functions; web browsing instructions 1764 to facilitate web browsing-related processes and functions; media processing instructions 1766 to facilitate media processing-related processes and functions; GPS/Navigation instructions 1768 to facilitate GPS and navigation-related processes and instructions; camera instructions 1770 to facilitate camera-related processes and functions; magnetometer data 1772 and calibration instructions 1774 to facilitate magnetometer calibration. The memory 1750 may also store other software instructions (not shown), such as security instructions, web video instructions to facilitate web video-related processes and functions, and/or web shopping instructions to facilitate web shopping-related processes and functions. In some implementations, the media processing instructions 1766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1750. Memory 1750 can store location instructions 1776 that, when executed by processor(s) 1704, cause processor(s) 1704 to perform operations of mobile device 102, sampling device 202, or location server 214.

Each of the above identified instructions and applications can correspond to a set of instructions for performing one or more functions described above. These instructions need not be implemented as separate software programs, procedures, or modules. Memory 1750 can include additional instructions or fewer instructions. Furthermore, various functions of the mobile device may be implemented in hardware and/or in software, including in one or more signal processing and/or application specific integrated circuits.

Exemplary Operating Environment

Figure 18:
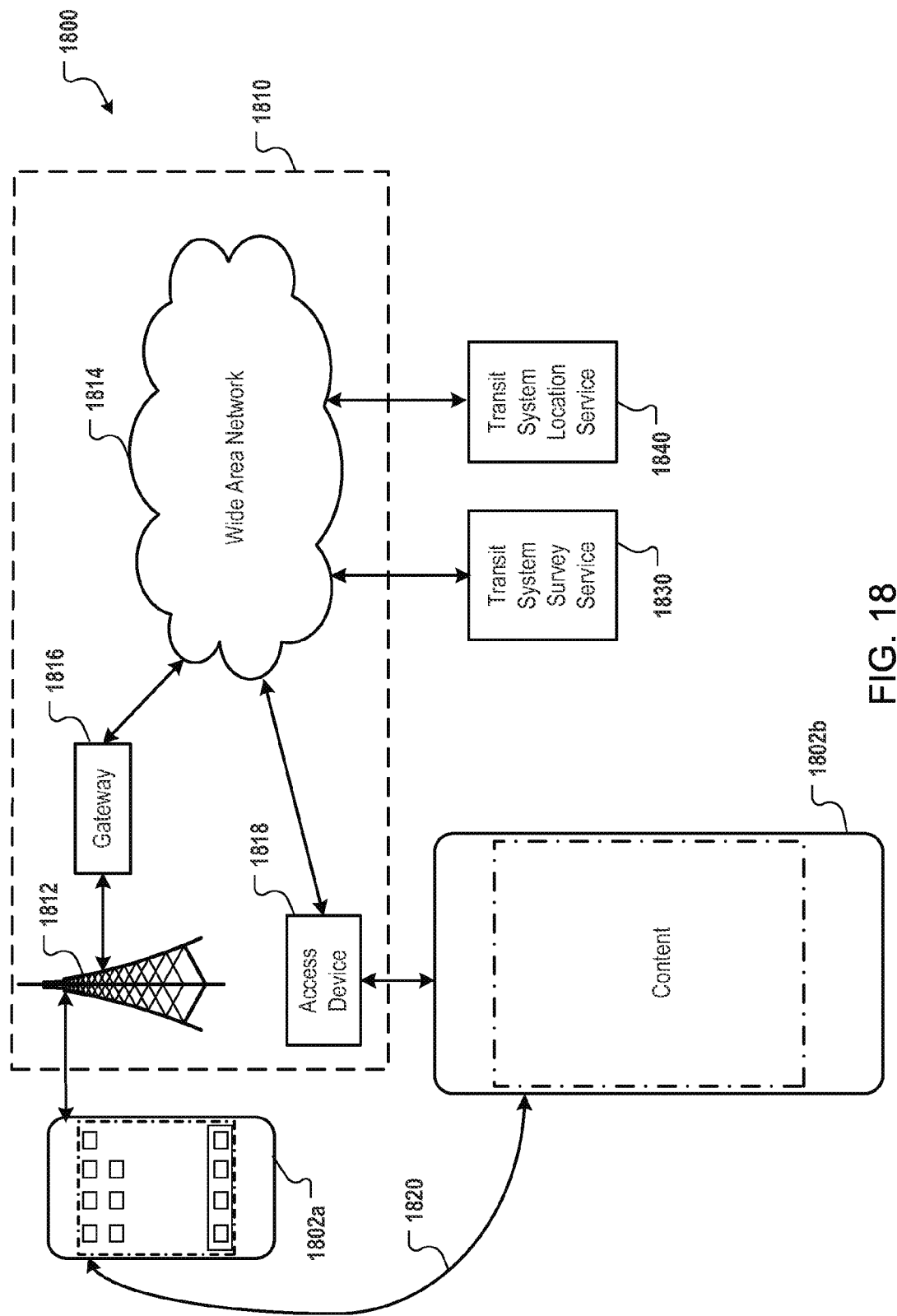
FIG. 18 is a block diagram of an exemplary network operating environment for the mobile devices of FIGS. 1-15.

FIG. 18 is a block diagram of an exemplary network operating environment 1800 for the mobile devices of FIGS. 1-15. Mobile devices 1802a and 1802b can, for example, communicate over one or more wired and/or wireless networks 1810 in data communication. For example, a wireless network 1812, e.g., a cellular network, can communicate with a wide area network (WAN) 1814, such as the Internet, by use of a gateway 1816. Likewise, an access device 1818, such as an 802.11g wireless access point, can provide communication access to the wide area network 1814.

In some implementations, both voice and data communications can be established over wireless network 1812 and the access device 1818. For example, mobile device 1802a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1812, gateway 1816, and wide area network 1814 (e.g., using Transmission Control Protocol/Internet Protocol (TCP/IP) or User Datagram Protocol (UDP)). Likewise, in some implementations, the mobile device 1802b can place and receive phone calls, send and receive e-mail messages, and retrieve electronic documents over the access device 1818 and the wide area network 1814. In some implementations, mobile device 1802a or 1802b can be physically connected to the access device 1818 using one or more cables and the access device 1818 can be a personal computer. In this configuration, mobile device 1802a or 1802b can be referred to as a "tethered" device.

Mobile devices 1802a and 1802b can also establish communications by other means. For example, wireless mobile device 1802a can communicate with other wireless devices, e.g., other mobile devices, cell phones, etc., over the wireless network 1812. Likewise, mobile devices 1802a and 1802b can establish peer-to-peer communications 1820, e.g., a personal area network, by use of one or more communication subsystems, such as the Bluetooth™ communication devices. Other communication protocols and topologies can also be implemented.

The mobile device 1802a or 1802b can, for example, communicate with one or more services 1830 and 1840 over the one or more wired and/or wireless networks. For example, one or more transit system survey services 1830 can conduct surveys of transit systems, generating location fingerprint data for each transit system. Transit system location service 1840 can, for example, provide maps of transit systems, connectivity of transit systems, and location fingerprints of transit systems to mobile device 1802a or 1802b.

Mobile device 1802a or 1802b can also access other data and content over the one or more wired and/or wireless networks. For example, content publishers, such as news sites, Really Simple Syndication (RSS) feeds, web sites, blogs, social networking sites, developer networks, etc., can be accessed by mobile device 1802a or 1802b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method comprising:
   obtaining, by one or more computer processors, sensor readings that are taken by a sampling mobile device in a transit system that includes a route, stations on the route, and one or more platforms at each station, each sensor reading being associated with a timestamp and a tag indicating on which portion of the transit system the reading was taken;
   determining, by the one or more computer processors and using the timestamps and tags of the sensor readings, an estimated motion state of the sampling mobile device at each of a plurality of time points when the sampling mobile device traveled in the transit system;
   determining, by the one or more computer processors and using the motion states, that the sampling mobile device traveled from a first station having a first platform and a second platform to a second station having a third platform and a fourth platform through a directed route connecting the first platform of the first station and the third platform of the second station;
   determining, using the motion states, a time-based probability distribution of location of a user device traveling from the first platform of the first station to the third platform of the second station along the route and a probability distribution of time the user device stays on the first platform or the third platform; and
   providing the probability distributions to a user device for estimating a location of the user device.

2. The method of claim 1, wherein:
   the transit system is a subway system where signals from a global positioning satellite system are unavailable or inaccurate for location determination, and
   the sensor readings include readings from at least one of an accelerometer, a magnetometer, an air pressure sensor, a gyroscope, a light sensor, a sound pressure sensor, or a radio receiver coupled to the sampling mobile device.

3. The method of claim 1, wherein:
the sensor readings include received signal strength indications (RSSIs) of radio frequency signals from one or more RF signal sources, each signal source is a cell site of a cellular communications network, a wireless access point, or a Bluetooth™ low energy (BLE) beacon, and
each measurement is associated with an identifier of a corresponding signal source.

4. The method of claim 1, wherein:
the sensor readings comprise a plurality of measurements taken at the first platform and the third platform, each measurement is associated with an identifier of a signal source, each tag including an identifier of the platform and an identifier of the station where the measurements are taken.

5. The method of claim 1, wherein:
each tag includes an indication whether a surveyor carrying the sampling mobile device is in a train and remains stationary relative to the train, whether the surveyor is walking on the train, whether the train is moving along a track, whether the train is accelerating or decelerating, and whether the train has stopped at a station.

6. The method of claim 1, wherein:
the readings are inertial sensor readings indicating motion states of the sampling mobile device, and
determining the time-based probability distribution of the location of the user device comprises:
converting a sequence of measurements from a time dimension to a space dimension by associating the timestamps with the inertial sensor readings; and
determining the time-based probability distribution of the location of the user device over time since the user device leaves the first platform based on the converted sequence of measurements.

7. The method of claim 6, comprising overlaying a representative of the location of the user device and a representation of the transit system on a map.

8. The method of claim 1, wherein determining that the sampling mobile device traveled from the first station to the second station comprises:
upon determining that a combination of first sensor readings indicates that the sampling mobile device went from above ground to underground at a geographic location of the first station, determining that the sampling mobile device entered the first platform of the first station using a combination of second sensor readings; and
upon determining that a combination of second sensor readings indicate that the sampling mobile device is located at the third platform of the second station, determining that the sampling mobile device went from underground to above ground at the second station using a combination of first sensor readings.

9. The method of claim 1, wherein:
the readings are associated with an identifier of an operator of the transit system and at least one of a name of the station or geographic coordinates of the portion of the route, and
providing the probability distribution to a user device comprises:
receiving a request from the user device for location fingerprint data of the transit system, the request includes the identifier of the transit system; and
in response to the request, providing the probability distribution to the user device.

10. The method of claim 1, wherein the one or more computer processors are components of a mobile device or a server computer system.

11. A system comprising:
a one or more computer processors;
a non-transitory computer-readable medium storing instructions operable to cause the one or more computer processors to perform operations comprising:
obtaining, by one or more computer processors, sensor readings that are taken by a sampling mobile device in a transit system that includes a route, stations on the route, and one or more platforms at each station, each sensor reading being associated with a timestamp and a tag indicating on which portion of the transit system the reading was taken;
determining, by the one or more computer processors and using the timestamps and tags of the sensor readings, an estimated motion state of the sampling mobile device at each of a plurality of time points when the sampling mobile device traveled in the transit system;
determining, by the one or more computer processors and using the motion states, that the sampling mobile device traveled from a first station having a first platform and a second platform to a second station having a third platform and a fourth platform through a directed route connecting the first platform of the first station and the third platform of the second station;
determining, using the motion states, a time-based probability distribution of location of a user device traveling from the first platform of the first station to the third platform of the second station along the route and a probability distribution of time the user device stays on the first platform or the third platform; and
providing the probability distributions to a user device for estimating a location of the user device.

12. The system of claim 11, wherein:
the transit system is a subway system where signals from a global positioning satellite system are unavailable or inaccurate for location determination, and
the sensor readings include readings from at least one of an accelerometer, a magnetometer, an air pressure sensor, a gyroscope, a light sensor, a sound pressure sensor, or a radio receiver coupled to the sampling mobile device.

13. The system of claim 11, wherein:
the sensor readings include received signal strength indications (RSSIs) of radio frequency signals from one or more RF signal sources, each signal source is a cell site of a cellular communications network, a wireless access point, or a Bluetooth™ low energy (BLE) beacon, and
each measurement is associated with an identifier of a corresponding signal source.

14. The system of claim 11, wherein:
the sensor readings comprise a plurality of measurements taken at the first platform and the third platform, each measurement is associated with an identifier of a signal source, each tag including an identifier of the platform and an identifier of the station where the measurements are taken.

15. The system of claim 11, wherein:
each tag includes an indication whether a surveyor carrying the sampling mobile device is in a train and remains stationary relative to the train, whether the surveyor is walking on the train, whether the train is moving along a track, whether the train is accelerating or decelerating, and whether the train has stopped at a station.

16. The system of claim 11, wherein:
the readings are inertial sensor readings indicating motion states of the sampling mobile device, and
determining the time-based probability distribution of the location of the user device comprises:

converting a sequence of measurements from a time dimension to a space dimension by associating the timestamps with the inertial sensor readings; and determining the time-based probability distribution of the location of the user device over time since the user device leaves the first platform based on the converted sequence of measurements.

17. The system of claim 16, comprising overlaying a representative of the location of the user device and a representation of the transit system on a map.

18. The system of claim 11, wherein determining that the sampling mobile device traveled from the first station to the second station comprises:

upon determining that a combination of first sensor readings indicates that the sampling mobile device went from above ground to underground at a geographic location of the first station, determining that the sampling mobile device entered the first platform of the first station using a combination of second sensor readings; and upon determining that a combination of second sensor readings indicate that the sampling mobile device is located at the third platform of the second station, determining that the sampling mobile device went from underground to above ground at the second station using a combination of first sensor readings.

19. The system of claim 11, wherein:

the readings are associated with an identifier of an operator of the transit system and at least one of a name of the station or geographic coordinates of the portion of the route, and providing the probability distribution to a user device comprises:

receiving a request from the user device for location fingerprint data of the transit system, the request includes the identifier of the transit system; and in response to the request, providing the probability distribution to the user device.

20. The system of claim 11, wherein the one or more computer processors are components of a mobile device or a server computer system.

21. A non-transitory computer-readable medium storing instructions operable to cause one or more computer processors to perform operations comprising:

obtaining, by the one or more computer processors, sensor readings that are taken by a sampling mobile device in a transit system that includes a route, stations on the route, and one or more platforms at each station, each sensor reading being associated with a timestamp and a tag indicating on which portion of the transit system the reading was taken;

determining, by the one or more computer processors and using the timestamps and tags of the sensor readings, an estimated motion state of the sampling mobile device at each of a plurality of time points when the sampling mobile device traveled in the transit system;

determining, by the one or more computer processors and using the motion states, that the sampling mobile device traveled from a first station having a first platform and a second platform to a second station having a third platform and a fourth platform through a directed route connecting the first platform of the first station and the third platform of the second station;

determining, using the motion states, a time-based probability distribution of location of a user device traveling from the first platform of the first station to the third platform of the second station along the route and a probability distribution of time the user device stays on the first platform or the third platform; and providing the probability distributions to a user device for estimating a location of the user device.

22. The non-transitory computer-readable medium of claim 21, wherein:

the transit system is a subway system where signals from a global positioning satellite system are unavailable or inaccurate for location determination, and the sensor readings include readings from at least one of an accelerometer, a magnetometer, an air pressure sensor, a gyroscope, a light sensor, a sound pressure sensor, or a radio receiver coupled to the sampling mobile device.

23. The non-transitory computer-readable medium of claim 21, wherein:

the sensor readings include received signal strength indications (RSSIs) of radio frequency signals from one or more RF signal sources, each signal source is a cell site of a cellular communications network, a wireless access point, or a Bluetooth™ low energy (BLE) beacon, and each measurement is associated with an identifier of a corresponding signal source.

24. The non-transitory computer-readable medium of claim 21, wherein:

the sensor readings comprise a plurality of measurements taken at the first platform and the third platform, each measurement is associated with an identifier of a signal source, each tag including an identifier of the platform and an identifier of the station where the measurements are taken.

25. The non-transitory computer-readable medium of claim 21, wherein:

each tag includes an indication whether a surveyor carrying the sampling mobile device is in a train and remains stationary relative to the train, whether the surveyor is walking on the train, whether the train is moving along a track, whether the train is accelerating or decelerating, and whether the train has stopped at a station.

26. The non-transitory computer-readable medium of claim 21, wherein:

the readings are inertial sensor readings indicating motion states of the sampling mobile device, and determining the time-based probability distribution of the location of the user device comprises:

converting a sequence of measurements from a time dimension to a space dimension by associating the timestamps with the inertial sensor readings; and determining the time-based probability distribution of the location of the user device over time since the user device leaves the first platform based on the converted sequence of measurements.

27. The non-transitory computer-readable medium of claim 26, comprising overlaying a representative of the location of the user device and a representation of the transit system on a map.

28. The non-transitory computer-readable medium of claim 21, wherein determining that the sampling mobile device traveled from the first station to the second station comprises:

upon determining that a combination of first sensor readings indicates that the sampling mobile device went from above ground to underground at a geographic location of the first station, determining that the sampling mobile device entered the first platform of the first station using a combination of second sensor readings; and upon determining that a combination of second sensor readings indicate that the sampling mobile device is located at the third platform of the second station, determining that the sampling mobile device went from underground to above ground at the second station using a combination of first sensor readings.

29. The non-transitory computer-readable medium of claim 21, wherein:
the readings are associated with an identifier of an operator of the transit system and at least one of a name of the station or geographic coordinates of the portion of the route, and
providing the probability distribution to a user device comprises:
receiving a request from the user device for location fingerprint data of the transit system, the request includes the identifier of the transit system; and
in response to the request, providing the probability distribution to the user device.

30. The non-transitory computer-readable medium of claim 21, wherein the one or more computer processors are components of a mobile device or a server computer system.

* * * * *